United States Patent
Ishikawa et al.

(10) Patent No.: US 10,698,388 B2
(45) Date of Patent: Jun. 30, 2020

(54) FIELD DEVICE

(71) Applicant: YOKOGAWA ELECTRIC CORPORATION, Tokyo (JP)

(72) Inventors: Ikuhiko Ishikawa, Tokyo (JP); Toru Shimura, Tokyo (JP); Daisuke Harigane, Tokyo (JP); Shinnosuke Yoshida, Tokyo (JP)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 315 days.

(21) Appl. No.: 15/365,183

(22) Filed: Nov. 30, 2016

(65) Prior Publication Data

US 2017/0160727 A1   Jun. 8, 2017

(30) Foreign Application Priority Data

Dec. 3, 2015   (JP) .................................. 2015-236596

(51) Int. Cl.
| | | |
|---|---|---|
| *G05B 19/10* | (2006.01) | |
| *G05B 19/418* | (2006.01) | |
| *G05B 23/02* | (2006.01) | |
| *G01F 25/00* | (2006.01) | |

(52) U.S. Cl.
CPC ..... *G05B 19/4184* (2013.01); *G05B 23/0267* (2013.01); *G01F 25/00* (2013.01); *G05B 2219/24054* (2013.01); *G05B 2219/31001* (2013.01); *G05B 2219/32344* (2013.01)

(58) Field of Classification Search
None
See application file for complete search history.

(56) References Cited

U.S. PATENT DOCUMENTS

| | | | |
|---|---|---|---|
| 2004/0199351 A1 | 10/2004 | Ott et al. | |
| 2007/0043539 A1* | 2/2007 | Niina | G05B 23/0221 702/188 |
| 2011/0054643 A1* | 3/2011 | Law | G06F 11/3636 700/79 |
| 2013/0253897 A1* | 9/2013 | Kanbe | G05B 11/01 703/13 |

(Continued)

FOREIGN PATENT DOCUMENTS

| | | |
|---|---|---|
| JP | 2007-521470 A | 8/2007 |
| JP | 2008-242615 A | 10/2008 |

(Continued)

OTHER PUBLICATIONS

Netatmo: "Netatmo User Manual", Version 1, Sep. 30, 2012, XP055358239, 24 pages total.

*Primary Examiner* — Benjamin P Sandvik
(74) *Attorney, Agent, or Firm* — Sughrue Mion, PLLC

(57) ABSTRACT

A field device, which measures a physical quantity in a plant or processes the physical quantity, includes: an instruction unit configured to output a verification execution instruction signal for instructing execution of verification of the field device; an operation verifying unit configured to verify an operation of at least one element of the field device in response to the verification execution instruction signal and to verify an operation of the field device based on the verification result; and an output unit configured to output the verification result which is a result of verification of the operation by the operation verifying unit.

14 Claims, 4 Drawing Sheets

(56) References Cited

U.S. PATENT DOCUMENTS

| | | | | |
|---|---|---|---|---|
| 2013/0304411 A1* | 11/2013 | Berndt | ................ | G01F 25/0007 |
| | | | | 702/116 |
| 2013/0340498 A1* | 12/2013 | Tanabe | ................ | G01F 25/0007 |
| | | | | 73/1.16 |
| 2014/0379134 A1* | 12/2014 | Tsuchiya | ............ | G05B 19/0426 |
| | | | | 700/275 |
| 2015/0070007 A1* | 3/2015 | Kurniawan | ............ | G01R 35/00 |
| | | | | 324/251 |
| 2017/0184440 A1* | 6/2017 | Shimura | ............ | G01F 25/0007 |

FOREIGN PATENT DOCUMENTS

| | | | |
|---|---|---|---|
| JP | 2013-160716 A | 8/2013 | |
| JP | 5574191 B1 | 8/2014 | |
| WO | 2005/062003 A1 | 7/2005 | |

\* cited by examiner

FIELD DEVICE

BACKGROUND OF THE INVENTION

Field of the Invention

The present invention relates to a field device.

Priority is claimed on Japanese Patent Application No. 2015-236596, filed Dec. 3, 2015, the content of which is incorporated herein by reference.

Description of Related Art

All patents, patent applications, patent publications, scientific articles, and the like, which will hereinafter be cited or identified in the present application, will hereby be incorporated by reference in their entirety in order to describe more fully the state of the art to which the present invention pertains.

In a plant including various facilities, a plurality of field instruments (measuring instruments or actuators) which are called field devices are installed for the purpose of monitoring an operating status of each facility disposed in the plant or controlling operations of the facilities. In such a plant, a checking operation of routinely or periodically checking operations of field devices is performed in order to maintain soundness of the field devices, that is, to enable the field devices to accurately detect the operating statuses of facilities.

Conventionally, when a field device is checked, a method of having an operator perform a checking operation of moving to a place in which the field device is installed with a paper maintenance log on which to write items, details, or the like to be checked and checking a display of a display unit of the field device based on the maintenance log is used. At this time, so-called calibration of connecting a reference signal generator or the like outputting a reference output signal instead of a sensor of the field device to the field device and checking or adjusting the field device based on the output signal output from the connected reference signal generator may be performed.

Recently, for example, like a technique disclosed in Japanese Patent No. 5574191, an operation verifying system that verifies soundness of a field device using an operation verifying tool has been proposed. In the technique disclosed in Japanese Patent No. 5574191, parameters or data output from the field device to the device checking terminal are acquired, for example, by connecting a device checking terminal executing the operation verifying tool to the field device and performing communication in a communication standard that the field device supports. The device checking terminal verifies the soundness of the field device by performing a process of comparing the acquired parameters or data with a predetermined determination criterion. Accordingly, in the technique disclosed in Japanese Patent No. 5574191, the soundness of the field device can be verified in real time.

In order to verify soundness of a field device, many parameters or a large amount of data is required for each item to be verified. Accordingly, in the technique disclosed in Japanese Patent No. 5574191, many parameters or a large amount of data output from the field device is input to the device checking terminal to verify the soundness of the field device. However, since the communication of the communication standard that a field device supports employs a communication mode of transmitting data using a communication signal which is superimposed on the output signal of the field device, a communication speed for exchanging (transmitting) the parameters or data is low. Accordingly, in verification of the soundness of the field device using the technique disclosed in Japanese Patent No. 5574191, much time is required to acquire the many parameters or large amount of data from the field device and much time is required until the device checking terminal completes the verification of the soundness of the field device. That is, in the related art, the checking operation of verifying soundness of a field device has poor efficiency.

SUMMARY OF THE INVENTION

The present invention is made in consideration of the above-mentioned problem and an object thereof is to provide a field device that can enable an efficient checking operation of verifying soundness of the field device.

According to an aspect of the present invention, a field device is provided that measures a physical quantity in a plant or processes the physical quantity, including: an instruction unit configured to output a verification execution instruction signal for instructing execution of verification of the field device; an operation verifying unit configured to verify an operation of at least one element of the field device in response to the verification execution instruction signal and to verify an operation of the field device based on the verification result; and an output unit configured to output the verification result which is a result of verification of the operation by the operation verifying unit.

The field device according to an aspect of the present invention may further include a storage unit configured to store the verification result corresponding to the at least one element of which the operation is verified by the operation verifying unit and the verification result corresponding to the field device.

In the field device according to an aspect of the present invention, the storage unit may store at least one of the verification result of verification which is executed in an initial stage of the field device and the verification result of verification which is executed in an installation stage in which the field device is installed in the plant and the verification result of verification which is executed in an operating stage in which the field device is operated.

In the field device according to an aspect of the present invention, the storage unit may store information of a date and time at which verification is executed in the operating stage of the field device in correlation with the verification result of the verification to correspond to a predetermined number of times.

The field device according to an aspect of the present invention may further include a measuring unit configured to measure the physical quantity and to output a measurement signal indicating the measurement result, and the operation verifying unit may be configured to output a simulated measurement signal which simulates the measurement signal and verify an operation of the element included in a path from an input of the measurement signal to an output of a digital signal based on the measurement signal using the simulated measurement signal.

In the field device according to an aspect of the present invention, the simulated measurement signal may be a signal which simulates at least one of voltage, current, time difference, phase difference, and frequency which are output as the measurement signal from the measuring unit.

In the field device according to an aspect of the present invention, the output unit may include a display unit configured to present the verification result, and the instruction unit may include an operation unit configured to output the verification execution instruction signal in response to an operation by an operator.

In the field device according to an aspect of the present invention, the output unit may transmit the verification result via a communication network which is constructed in the plant.

According to an aspect of the present invention, a method of measuring a physical quantity in a plant or processing the physical quantity by a filed device, includes: an instruction step of outputting a verification execution instruction signal for instructing execution of verification of the field device; an operation verifying step of verifying an operation of at least one element of the field device in response to the verification execution instruction signal and to verify an operation of the field device based on the verification result; and an output step of outputting the verification result which is a result of verification of the operation by the operation verifying step.

The method may further includes a storage step of storing the verification result corresponding to the at least one element of which the operation is verified by the operation verifying step and the verification result corresponding to the field device.

The storage step may include a step of storing at least one of the verification result of verification which is executed in an initial stage of the field device and the verification result of verification which is executed in an installation stage in which the field device is installed in the plant and the verification result of verification which is executed in an operating stage in which the field device is operated.

The storage step may further include a step of storing information of a date and time at which verification is executed in the operating stage of the field device in correlation with the verification result of the verification to correspond to a predetermined number of times.

The method may further include a measuring step of measuring the physical quantity and outputting a measurement signal indicating the measurement result. The operation verifying step may include: a step of outputting a simulated measurement signal which simulates the measurement signal; and a step of verifying an operation of the element included in a path from an input of the measurement signal to an output of a digital signal based on the measurement signal using the simulated measurement signal.

The simulated measurement signal may be a signal which simulates at least one of voltage, current, time difference, phase difference, and frequency which are output as the measurement signal from the measuring step.

The output step may include a step of transmitting the verification result via a communication network which is constructed in the plant.

According to the present invention, it is possible to efficiently perform a checking operation of verifying soundness of a field device.

BRIEF DESCRIPTION OF THE DRAWINGS

The above features and advantages of the present invention will be more apparent from the following description of certain preferred embodiments taken in conjunction with the accompanying drawings.

DETAILED DESCRIPTION OF THE INVENTION

Figure 1:
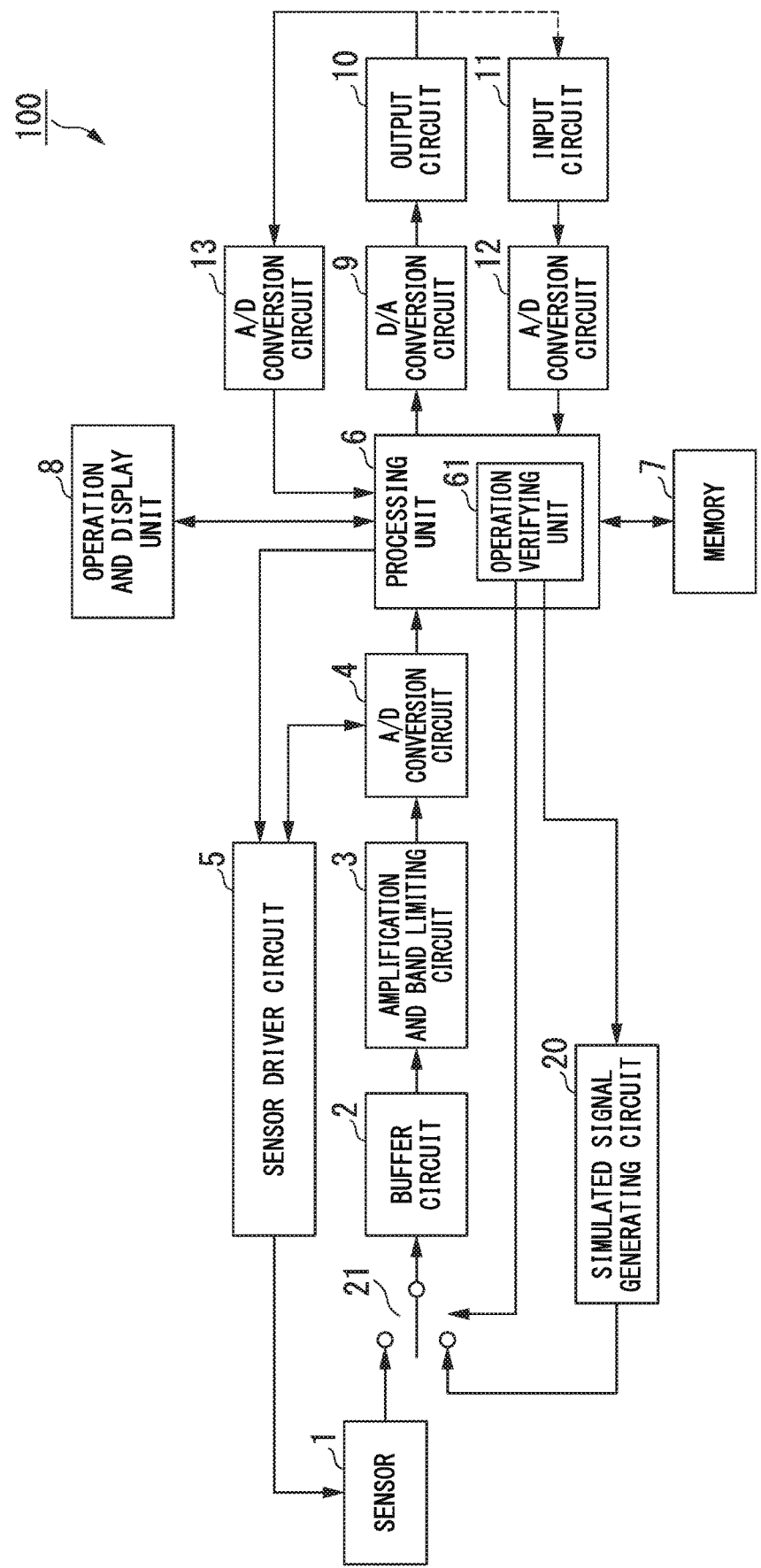
FIG. 1 is a block diagram schematically illustrating a configuration of a field device according to an embodiment of the present invention.

Hereinafter, an embodiment of the present invention will be described with reference to the accompanying drawings. FIG. 1 is a block diagram schematically illustrating a configuration of a field device according to an embodiment of the present invention. The field device 100 includes a sensor 1, a buffer circuit 2, an amplification and band limiting circuit 3, an analog/digital (A/D) conversion circuit 4, a sensor driver circuit 5, a processing unit 6, a memory 7, an operation and display unit 8, a digital/analog (D/A) conversion circuit 9, an output circuit 10, an input circuit 11, an A/D conversion circuit 12, an A/D conversion circuit 13, a simulated signal generating circuit 20, and a signal switch 21. The processing unit 6 includes an operation verifying unit 61.

The field device 100 is a field instrument which is installed in a facility disposed in a plant.

Examples of the plant include a plant that manages and controls a well site such as a gas field or an oil field or peripheries thereof, a plant that manages and controls power generation such as hydraulic power generation, thermal power generation, or atomic power generation, a plant that manages and controls environmental power generation such as photovoltaic power generation or wind power generation, and a plant that manages and controls water supply and sewerage, a dam, or the like, in addition to an industrial plant that refines petroleum or produces chemical products.

An example of the field device 100 is a measuring instrument having a measuring function of measuring an operating status (for example, a flow rate, a pressure, a temperature, and a level) when a facility having the field device installed therein operates. More specifically, examples of the field device 100 include various types of flow meters such as an electromagnetic flow meter, a vertex flow meter, a Coriolis flow meter, and an ultrasonic flow meter, a pressure transmitter, a temperature transmitter, and a level meter. Another example of the field device 100 is an actuator having a control function (such as an actuator) of controlling operations of installed facilities in response to an input control signal. FIG. 1 illustrates the configuration of the field device 100 having a measuring function. In addition, examples of the field device 100 include a vibrometer, a noise meter, a thermometer, and a corrosion detector that measure vibration, sound, and heat emitted from, for example, a motor and corrosion of a pipe or the like as physical quantities in the plant.

The sensor 1 is a measuring unit that measures a current operating status (for example, a flow rate, a pressure, a temperature, and a level) in a facility in which the field device 100 is installed. The sensor 1 outputs a measurement signal of a measurement result to the buffer circuit 2. The configuration of the sensor 1 varies depending on the type of the field device 100. Details of the configuration of the sensor 1 varying depending on the type of the field device 100 will be described later.

The sensor driver circuit 5 is a driver unit that drives the sensor 1 in response to a control signal input from the processing unit 6. The configuration of the sensor driver circuit 5 varies depending on the type of the field device 100. The field device 100 may not be provided with the sensor driver circuit 5 depending on the type of the field device 100. Details of the configuration of the sensor driver circuit 5 varying depending on the type of the field device 100 will be described later.

The buffer circuit 2 is a buffer circuit that transmits the measurement signal output from the sensor 1 to the amplification and band limiting circuit 3. The buffer circuit 2 converts impedance of the measurement signal output from the sensor 1 and outputs the measurement signal having the impedance converted to the amplification and band limiting circuit 3.

The amplification and band limiting circuit 3 is a conversion circuit that converts the measurement signal subjected to the conversion of impedance, which is output from the buffer circuit 2, in signal level or range and outputs the converted measurement signal to the A/D conversion circuit 4. The amplification and band limiting circuit 3 has an amplification function of amplifying the measurement signal output from the buffer circuit 2 or a band limiting function of limiting a frequency band of the measurement signal output from the buffer circuit 2. More specifically, the amplification and band limiting circuit 3 converts (amplifies) a signal level of the measurement signal output from the buffer circuit 2 to a level at which a resolution of analog/digital conversion in the A/D conversion circuit 4 can be taken satisfactorily and outputs the level-converted measurement signal to the A/D conversion circuit 4. The amplification and band limiting circuit 3 removes an unnecessary noise component included in the measurement signal by limiting the frequency band of the measurement signal output from the buffer circuit 2 using a low-pass filter (LPF), a high-pass filter (HPF), a band-pass filter (BPF), or the like, and outputs the measurement signal from which the noise component is removed to the A/D conversion circuit 4. In the following description, the measurement signal output from the amplification and band limiting circuit 3 is referred to as an "analog measurement signal."

The A/D conversion circuit 4 converts the analog measurement signal (analog signal) output from the amplification and band limiting circuit 3 in an analog-digital conversion manner, and generates a digital signal of a digital value (hereinafter referred to as a "digital measurement signal") corresponding to the signal level of the measurement signal measured by the sensor 1. The A/D conversion circuit 4 outputs the generated digital measurement signal to the processing unit 6.

The A/D conversion circuit 4 may be configured to convert the measurement signal (the analog signal) in an analog-digital conversion manner based on a signal which is transmitted to and received from the sensor driver circuit 5 depending on the type of the field device 100. For example, when the field device 100 is an electromagnetic flow meter, the A/D conversion circuit 4 may be configured to change a range of the digital value of the digital measurement signal subjected to the analog-digital conversion based on a current value of an excitation current output from the sensor driver circuit 5 to the sensor 1.

The processing unit 6 is a controller that controls elements disposed in the field device 100. The processing unit 6 is constituted by, for example, a central processing unit (CPU), and controls all elements of the field device 100 based on an application program or data for realizing the functions of the field device 100. The processing unit 6 may be a calculation processing unit that performs a predetermined calculation process for presenting an operating status of the facility in which the field device 100 is installed in accordance with the executed application program. More specifically, the processing unit 6 performs, for example, a calculation process of converting the digital value corresponding to the signal level of the measurement signal, which is measured by the sensor 1 and indicated by the digital measurement signal output from the A/D conversion circuit 4, into a digital signal of a digital value indicating the operating status of the facility having the field device installed therein using the level of a DC analog signal in a range of 4 mA to 20 mA and outputs the digital signal subjected to the calculation process to the D/A conversion circuit 9. The processing unit 6 performs a calculation process of generating display data for displaying the operating status of the installed facility on the operation and display unit 8, outputs the display data subjected to the calculation process to the operation and display unit 8, and controls display of the display data on the operation and display unit 8.

The processing unit 6 also performs control for transmitting the digital signal subjected to the calculation process to, for example, a controller controlling the operation of the facilities in the plant via a communication network which is exclusively constructed in the plant. The communication network constructed in the plant is a communication network for transmitting and receiving data between the field device 100 and the controller using various communication standards or modes such as an industrial wireless communication network such as ISA100.11a, a wireless communication standard of a sensor network system or the like, a communication standard in which wireless communication and wired communication are combined such as Wireless/Wired HART (registered trademark), a master/slave type communication standard such as MODBUS (registered trademark), and a field bus standard such as a FOUNDATION (registered trademark) field bus or a PROFIBUS (PROCESS FIELD BUS) (registered trademark). The communication network may be a communication network for transmitting and receiving data between the field device 100 and the controller, for example, using a general WiFi (registered trademark) wireless standard.

The processing unit 6 starts the operation verifying unit 61 in response to a verification execution instruction signal input from the operation and display unit 8 which is operated by an operator performing a checking operation on the field device 100 in the plant and verifies the operations of the elements of the field device 100. When verifying the operations of the elements of the field device 100, the operation verifying unit 61 executes an operation verifying program and controls the operations of the elements of the field device 100 in accordance with the executed operation verifying program. The operation verifying program is an application program for verifying the operations of the elements of the field device 100. The operation verifying program is stored in a storage unit of the processing unit 6 or the memory 7 which is the storage unit of the field device 100. The operation verifying unit 61 outputs a result of the operation verification (a verification result) of each element which is executed in accordance with the executed operation verifying program for each verification item. The operation verifying unit 61 outputs a final determination result of the verification results of all the verification items, that is, a final verification result of soundness of the field device 100. The processing unit 6 stores the verification result for each verification item of each element and the final verification result of soundness which are output from the operation verifying unit 61 (hereinafter, also simply referred to as a "verification result" when the verification results are not distinguished) in the memory 7.

The processing unit 6 outputs the final verification result of soundness output from the operation verifying unit 61 as display data to the operation and display unit 8 and controls display of the display data on the operation and display unit 8. The processing unit 6 may be configured to display a status (statuses such as a progress level, an elapsed time, a scheduled end time, and end notification) when the operation verifying unit 61 is verifying the operations of the elements as display data on the operation and display unit 8. The processing unit 6 may be configured to sequentially display the verification result for each verification item of each element output from the operation verifying unit 61 as the display data on the operation and display unit 8. In this case, the processing unit 6 may be configured to switch the verification result displayed on the operation and display unit 8 in response to a verification result switching instruction input from the operation and display unit 8 which is operated by an operator. Details of the method of controlling the operations of the elements or verifying soundness of the field device 100 based on the operation verifying program will be described later.

The memory 7 is a storage unit that stores an application program which is executed by the processing unit 6 or data in execution of the application program. The memory 7 is constituted by various memories such as a read only memory (ROM), a random access memory (RAM), and a flash memory. The memory 7 is subjected to storage (writing) of data or outputting (reading) of data under the control of the processing unit 6.

The memory 7 is also a storage unit that stores the verification result for each verification item for each element of the field device 100 or the final verification result of soundness of the field device 100, which are acquired by causing the operation verifying unit 61 of the processing unit 6 to execute the operation verifying program. The memory 7 may store the operation verifying program which is executed by the operation verifying unit 61 of the processing unit 6.

The operations of the elements of the field device 100 are considered to be different in each of an initial stage in which the field device 100 is shipped, an installation stage in which the field device 100 is installed (instrumented) in the facility, that is, the field device 100 is installed in the plant, and an operation stage in which the field device 100 is installed and operated. Accordingly, the memory 7 may be configured to store a plurality of verification results in each stage to refer to the verification results of the elements in each stage at an arbitrary time. More specifically, the memory 7 may be configured to store the verification results in each stage such as the verification result (inspection data) which is acquired at the time of shipping the field device 100, the verification result (confirmation data) which is acquired at the time of installation (implementation) of the field device 100 in the facility, and the verification result (check data) which is acquired based on a soundness verification execution instruction (the verification execution instruction signal) issued by an operator in the checking operation at the time of operating the field device 100. At this time, the verification results of each stage may be stored in correlation with a date and time at which the operations of the elements are verified. For example, the check data corresponding to a predetermined number of times (for example, three times) may be stored in consideration of the magnitude of a storage capacity of the memory 7 or the like. In this configuration, it is preferable that the check data be stored in correlation with the date and time at which the operations of the elements are verified. Only one of the inspection data and the confirmation data may be stored in the memory 7. The date and time data may be acquired from a timer unit (not illustrated) having a timer function built in the field device 100 or outside of the field device 100 (such as a controller for controlling the operations of the facilities in the plant or the Global Positioning System (GPS)).

The operations of the elements of the field device 100 are considered to be different, for example, when repair or regular maintenance (maintenance) of the field device 100 is performed. Accordingly, the memory 7 may be configured to store the verification result (maintenance data) when the repair or maintenance of the field device 100 is performed or the like. In this case, the maintenance data may be stored in the memory 7 in correlation with a date and time at which the repair or maintenance of the field device 100 is performed or a date and time of verification of the operations of the elements after the repair or maintenance is performed. When a component of the field device 100 is replaced in the repair or maintenance of the field device 100 or the like, the maintenance data may be stored in the memory 7 instead of the inspection data or the confirmation data.

The operation and display unit 8 is a human-machine interface (HMI) including a display unit for displaying display data output from the processing unit 6 and an operation unit which is operated by an operator. The display unit is a display device such as a liquid crystal display (LCD) and presents information such as an operating status of the installed facility, the final verification result of soundness of the field device 100, the verification results of the elements subjected to the operation verification, and a current status (status) when the operation verification is performed to an operator by displaying the display data or the like output from the processing unit 6. The operation unit is, for example, an operation device including buttons or switches, receives an operation from an operator, and outputs information indicating the received operation from the operator, that is, an instruction signal indicating an instruction of the operation of the field device 100 by the operator, to the processing unit 6. When an operation of instructing execution of verification of soundness of the field device 100 is performed by the operator, the operation unit outputs a verification execution instruction signal based on the operation to the processing unit 6.

The operation unit is not limited to the configuration including buttons or switches, but may be constituted, for example, of a press sensor included in the display unit. That is, the operation and display unit 8 may be configured as a touch panel in which the display unit and the operation unit are combined. In this case, the operation and display unit 8 presents a variety of information to the operator by displaying the information on the display unit, receives an instruction of an operation of the field device 100 by causing the operation unit to detect various touch (such as tap or flick) operations which are performed by the operator based on the information displayed on the display unit, and outputs information indicating the received operation of the operator to the processing unit 6.

The D/A conversion circuit 9 converts the digital signal subjected to the calculation process, which is output from the processing unit 6, in a digital-analog conversion manner and generates an analog signal (for example, a DC analog signal in a range of 4 mA to 20 mA) indicating a signal level of a measurement signal measured by the sensor 1. The D/A conversion circuit 9 outputs the generated analog signal to the output circuit 10. The D/A conversion circuit 9 may perform, for example, PWM modulation at the time of the digital-analog conversion.

The output circuit 10 outputs the analog signal output from the D/A conversion circuit 9 as an output signal to, for example, the outside of the field device 100, such as a controller controlling operations of facilities in the plant. In the field device 100, under the control of the operation verifying unit 61 of the processing unit 6, the output signal output from the output circuit 10 may be input to the A/D conversion circuit 13 via a switch which is not illustrated. In the field device 100, under the control of the operation verifying unit 61 of the processing unit 6, the output signal output from the output circuit 10 may be input to the input circuit 11 via a switch which is not illustrated.

When the field device 100 performs communication via a communication network which is exclusively constructed in the plant, the output circuit 10 may be configured to superimpose a communication signal output from the processing unit 6 or a communication unit which is not illustrated on the output signal and to output the resultant signal. The communication signal output from the processing unit 6 or the communication unit which is not illustrated may include information which is displayed on the display unit of the operation and display unit 8, that is, information such as the operating statuses of installed facilities, the final verification result of soundness of the field device 100, the verification results of the elements subjected to the operation verification, and the current status (status) when the operation verification is performed. The output circuit 10 may be configured to include a communication unit or to have a transmission function of the communication unit.

The input circuit 11 outputs an input signal (an analog signal) input, for example, from the controller for controlling the operations of the facilities in the plant or the outside of the field device 100 such as an operation terminal device connected thereto to the A/D conversion circuit 12. The input signal input to the input circuit 11 is also, for example, a DC analog signal in a range of 4 mA to 20 mA, similar to the output signal output from the output circuit 10. Examples of the operation terminal device connected to the input circuit 11 include portable terminal devices such as a personal computer (PC) and a so-called tablet terminal having a function of a personal digital assistant (PDA), which are carried by the operator who performs the checking operation of the field device 100 in the plant.

When the field device 100 performs communication via the communication network which is exclusively constructed in the plant, the input circuit 11 may be configured to separate the communication signal superimposed on the input signal and to output the separated communication signal to the processing unit 6 or the communication unit which is not illustrated. The communication signal superimposed on the input signal may include instruction information corresponding to the verification execution instruction signal, which is output to the processing unit 6 by the operation unit of the operation and display unit 8 in response to the operation by the operator, indicating execution of soundness verification of the field device 100. The input circuit 11 may be configured to include a communication unit or to have a receiving function of the communication unit.

The A/D conversion circuit 12 converts the input signal (analog signal) output from the input circuit 11 in an analog-digital conversion manner and generates a digital signal of a digital value corresponding to the signal level of the input signal. The A/D conversion circuit 12 outputs the generated digital signal to the processing unit 6. Accordingly, the processing unit 6 performs an operation or a calculation process based on the digital signal output from the A/D conversion circuit 12, that is, information indicated by the input signal input to the field device 100.

The field device 100 may not include the input circuit 11 and the A/D conversion circuit 12 depending on the configuration of the field device 100.

The A/D conversion circuit 13 converts the output signal (analog signal) output from the output circuit 10 in an analog-digital conversion manner and generates a digital signal of a digital value corresponding to the signal level of the output signal. The A/D conversion circuit 13 outputs the generated digital signal to the processing unit 6. The digital signal output from the A/D conversion circuit 13 to the processing unit 6 is a digital signal which has been output to the D/A conversion circuit 9 by the processing unit 6, that is, a digital signal which has been subjected to the calculation process by the processing unit 6.

The simulated signal generating circuit 20 outputs a pseudo measurement signal corresponding to the measurement signal output from the sensor 1 of the field device 100, that is, a measurement signal which simulates the measurement signal output from the sensor 1 (hereinafter referred to as a "simulated measurement signal"), to the buffer circuit 2 when verifying the operations of the elements of the field device 100 under the control of the operation verifying unit 61 of the processing unit 6. In other words, when verifying the operations of the elements of the field device 100, the simulated signal generating circuit 20 outputs the measurement signal of a signal level required for the operation verification to the buffer circuit 2 instead of the sensor 1. The simulated signal generating circuit 20 adjusts the signal level of the simulated measurement signal to a level covering a range in which the elements operate under the control of the operation verifying unit 61 of the processing unit 6. Accordingly, in the field device 100, the operations of the elements of the field device 100 are verified, that is, coverage in verifying soundness of the field device 100 is enhanced. The simulated measurement signal output from the simulated signal generating circuit 20 varies depending on the type of the field device 100. Details of the simulated measurement signal varying depending on the type of the field device 100 will be described later.

In FIG. 1, the simulated signal generating circuit 20 is an element of the field device 100, but the simulated signal generating circuit 20 may be configured to be detachable from the field device 100. In this case, an operator attaches the simulated signal generating circuit 20 to the field device 100 when performing a checking operation of verifying soundness of the field device 100, and detaches the simulated signal generating circuit 20 from the field device 100 after the checking operation ends. The simulated signal generating circuit 20 configured to be detachable from the field device 100 may be realized, for example, by an operation terminal device carried by the operator. In this case, a simulated signal output from the operation terminal device is input to the signal switch 21.

The signal switch 21 switches the measurement signal to be output to the buffer circuit 2. More specifically, when the field device 100 performs a normal measuring operation of measuring an operating status of the installed facility, the signal switch 21 outputs the measurement signal output from the sensor 1 to the buffer circuit 2. On the other hand, when the field device 100 performs a verifying operation of verifying the soundness thereof, the signal switch 21 outputs the simulated measurement signal output from the simulated signal generating circuit 20 to the buffer circuit 2.

Depending on the type of the field device 100, the field device 100 may be configured not to include the signal switch 21. This is because the measurement signal to be output to the buffer circuit 2 does not have to be switched by the signal switch 21, for example, when the field device 100 is an electromagnetic flow meter and the sensor driver circuit 5 can control a pair of electrodes of the sensor 1 without measuring an electromotive force (a voltage) corresponding to a fluid speed such as when the sensor driver circuit 5 can stop an excitation current output to an excitation coil. When the field device 100 is an electromagnetic flow meter having this configuration, a so-called wired-OR signal line in which a signal line to which the measurement signal is output from the sensor 1 and a signal line to which the simulated measurement signal is output from the simulated signal generating circuit 20 are connected to each other is connected to the buffer circuit 2.

According to this configuration, in the field device 100, the field device 100 independently verifies the soundness of the field device 100 in accordance with the operation verifying program which is executed by the operation verifying unit 61 of the processing unit 6. In other words, the field device 100 verifies its own soundness without using an external device such as a device checking terminal which is connected to the field device in the related art. When the soundness of the field device 100 is verified, the operation verifying program which is executed by the operation verifying unit 61 verifies the soundness using many parameters or a large amount of data, similar to the case in which the soundness of the field device is verified in the related art. However, in the field device 100, many parameters or a large amount of data used to verify the soundness are internal parameters or data which is present in the field device 100. Accordingly, in the field device 100, many parameters or a large amount of data required for verifying the soundness does not need to be transmitted to the device checking terminal externally connected thereto by communication unlike the field device according to the related art. Accordingly, in the field device 100, a time from the start of the soundness verification to the end thereof, that is, a time required until the soundness verification is completed, can be shortened in comparison with the field device according to the related art. Particularly, in the field device 100, it is possible to remove a transmission time of many parameters or a large amount of data for which the field device according to the related art requires much time.

In the field device 100, the verification result of the soundness or the verification results of the elements are stored in the memory 7 of the field device 100. Accordingly, in the field device 100, the verification results stored in the memory 7 can be referred to at an arbitrary time. That is, in the field device 100, an operator (for example, an operator who has performed a checking operation on another field device 100 or an operator of the controller controlling the operation of the facility in the plant) other than the operator who has performed the checking operation can refer to the verification results. When referring to the verification results, introducing the verification results stored in the memory 7 into the operation terminal device or the controller by communication can also be considered. At this time, the verification results stored in the memory 7 of the field device 100 are data of the result of verification which has been performed by the field device 100 itself and thus are a small amount of data. Accordingly, in the field device 100, for example, only the verification results consisting of a sufficiently small amount of data of several tens of bytes have to be introduced into the operation terminal device or the controller by communication in comparison with the several hundreds of bytes of parameters or data which are introduced to verify the soundness of the field device according to the related art, and thus a communication time is shortened. Accordingly, in the field device 100, an operator other than the operator who has performed the checking operation can refer to the verification results more rapidly and thus can efficiently perform the checking operation on the field device 100 in the plant.

The configurations of the sensor 1 and the sensor driver circuit 5 varying depending on the type of the field device 100, the configuration of the simulated signal generating circuit 20, and an example of a simulated measurement signal output therefrom will be described below.

When the field device 100 is an electromagnetic flow meter, the sensor 1 includes a pair of electrodes and a magnetic circuit including an excitation coil for forming a magnetic field. The sensor 1 measures an electromotive force (a voltage) due to a flow of a conductive liquid (for example, liquid products or semi-finished products such as petroleum or chemicals) in the magnetic field formed by the excitation coil using a pair of electrodes, and outputs a voltage signal with the magnitude of the measured electromotive force (a voltage value) as a measurement signal indicating a velocity of the flowing liquid (a fluid velocity) to the buffer circuit 2.

When the field device 100 is an electromagnetic flow meter, the sensor driver circuit 5 corresponds to an excitation circuit that outputs an excitation current required for forming a magnetic field using the excitation coil included in the magnetic circuit of the sensor 1.

When the field device 100 is an electromagnetic flow meter, the simulated signal generating circuit 20 outputs a voltage signal of a voltage value, which simulates the magnitude of the electromotive force corresponding to the fluid velocity measured by the pair of electrodes of the sensor 1 in synchronization with the excitation current output from the sensor driver circuit 5 to the excitation coil, as the simulated measurement signal. More specifically, the simulated signal generating circuit 20 generates a voltage signal of a voltage value acquired by inserting a resistor of a resistance value corresponding to resistance of the fluid into the excitation coil, divides the generated voltage signal into predetermined voltage values by a voltage divider circuit, and generates a voltage signal which simulates various fluid velocities of the liquid measured by the sensor 1. The simulated signal generating circuit 20 outputs the generated voltage signal as the simulated measurement signal.

The simulated signal generating circuit 20 may be configured to include a current measuring circuit that measures the excitation current output to the coil included in the magnetic circuit of the sensor 1 and to generate a voltage signal based on the excitation current actually output from the sensor driver circuit 5. The simulated signal generating circuit 20 may be configured to set the voltage signal output when measuring the resistance values of the electrodes as the simulated measurement signal using an existing function of measuring resistance values of the electrodes of the sensor 1 and adjusting (calibrating) the electromagnetic flow meter. In this configuration, a generation circuit of the voltage signal for calibrating the field device 100 and the simulated signal generating circuit 20 can be used as a common circuit to reduce the circuit scale of the field device 100.

When the field device 100 is a vertex flow meter or a vibration type pressure transmitter, the sensor 1 includes a vertex shedder that generates a Karman vortex and a pressure sensor such as a piezoelectric element that measures a pressure due to the Karman vortex. The sensor 1 measures a period (a frequency) of the pressure which varies due to the Karman vortex, and outputs a sinusoidal signal of the measured frequency as the measurement signal indicating the fluid velocity to the buffer circuit 2.

When the field device 100 is a vertex flow meter or a vibration type pressure transmitter, the field device 100 may not include the sensor driver circuit 5.

When the field device 100 is a vertex flow meter or a vibration type pressure transmitter, the simulated signal generating circuit 20 outputs a sinusoidal signal, which simulates the period (frequency) of the pressure varying due to the Karman vortex measured by the pressure sensor such as a piezoelectric element of the sensor 1, as the simulated measurement signal. More specifically, the simulated signal generating circuit 20 generates a sinusoidal signal by causing a clock signal (a rectangular wave signal) of the frequency simulating the variation of the pressure measured by the pressure sensor of the sensor 1 to pass through a filter circuit such as a low pass filter (LPF), divides the generated sinusoidal signal into predetermined voltage values using a voltage divider circuit, and generates a sinusoidal signal which simulates various fluid velocities of a liquid measured by the sensor 1. The simulated signal generating circuit 20 outputs the generated sinusoidal signal as the simulated measurement signal. The clock signal (a rectangular wave signal) of the frequency simulating the variation of the pressure can be generated, for example, by dividing a clock signal (such as an original clock signal generated by a clock circuit which is not illustrated or a divided clock signal acquired by dividing the original clock signal) with which the processing unit 6 operates using a timer circuit (not illustrated) of the processing unit 6. That is, the simulated signal generating circuit 20 can generate a sinusoidal simulated measurement signal based on the clock signal (rectangular wave signal) input from the processing unit 6. When the field device 100 is a vertex flow meter or a vibration type pressure transmitter, the frequency of the clock signal (rectangular wave signal) simulating the variation of the pressure is considered to be, for example, several Hz to several tens of kHz.

When the field device 100 is a Coriolis flow meter, the sensor 1 includes a magnet coil that causes a U-shaped pipe to vibrate and two detection coils that measure a vibration phase. The magnet coil is disposed at the center of the U-shaped pipe and the two detection coils are disposed at both ends of the U-shaped pipe. The sensor 1 measures the vibration phase at each of the two detection coils and outputs two sinusoidal signals (phase difference signals) having the measured phase difference as the measurement signal indicating a fluid velocity to the buffer circuit 2.

When the field device 100 is a Coriolis flow meter, the sensor driver circuit 5 corresponds to a voltage generating circuit of a frequency required for causing the U-shaped pipe to vibrate using the magnet coil of the sensor 1.

When the field device 100 is a Coriolis flow meter, the simulated signal generating circuit 20 generates two sinusoidal signals which simulate the vibration phases of the U-shaped pipe measured by the two detection coils of the sensor 1, and outputs a set of phase difference signals, which are acquired by causing the generated sinusoidal signals to have a predetermined phase difference, as a simulated measurement signal. More specifically, the simulated signal generating circuit 20 generates clock signals (rectangular wave signals) of the frequencies which simulate the vibrations measured by the two detection coils of the sensor 1, for example, using a timer circuit (not illustrated) of the processing unit 6. More specifically, one rectangular wave signal is generated by counting a clock signal (such as an original clock signal generated by a clock circuit which is not illustrated or a divided clock signal acquired by dividing the original clock signal) with which the processing unit 6 operates using the timer circuit and inverting the waveform when the counted value reaches a predetermined value. The other rectangular wave signal is generated by inverting the waveform when the counted value of the timer circuit reaches a value different from the counted value at which the waveform of the first rectangular wave signal is inverted, that is, a value delayed by the time corresponding to the phase difference. A set of phase difference signals simulating various fluid velocities of the liquid measured by the sensor 1 are generated by forming sinusoidal signals by causing the two generated rectangular wave signals to pass through a filter circuit such as a low pass filter (LPF) and dividing the generated sinusoidal signals into predetermined voltage values using a voltage divider circuit. The simulated signal generating circuit 20 outputs the generated set of phase difference signals as the simulated measurement signal.

When the field device 100 is an ultrasonic flow meter, the sensor 1 includes a transmitter that transmits an ultrasonic signal (a pulse signal) and a receiver that receives an ultrasonic signal (a pulse signal). The sensor 1 measures a period of time from a time at which an ultrasonic signal is generated to a time at which the ultrasonic signal is received, that is, a propagation time in which the ultrasonic signal propagates and outputs two pulse signals indicating the measured propagation time as a measurement signal indicating a fluid velocity to the buffer circuit 2.

When the field device 100 is an ultrasonic flow meter, the sensor driver circuit 5 corresponds to an ultrasonic transmitting circuit that transmits an ultrasonic signal using the transmitter of the sensor 1.

When the field device 100 is an ultrasonic flow meter, the simulated signal generating circuit 20 generates a pulse signal which is transmitted from the transmitter of the sensor 1 and a pulse signal which is received by the receiver and outputs a set of pulse signals, which are acquired by causing the generated pulse signals to have a predetermined time difference, as a simulated measurement signal. More specifically, the simulated signal generating circuit 20 generates two pulse signals (rectangular wave pulse signals) having a time difference which simulate the pulse signal which is transmitted from the transmitter of the sensor 1 and the pulse signal which is received by the receiver, for example, using a timer circuit (not illustrated) of the processing unit 6. More specifically, a clock signal (such as an original clock signal generated by a clock circuit which is not illustrated or a divided clock signal acquired by dividing the original clock signal) with which the processing unit 6 operates is counted using the timer circuit and the pulse signal in which a pulse appears when the counted value reaches a predetermined value is generated as the pulse signal which is transmitted from the transmitter. The pulse signal which is received by the receiver is generated by causing a pulse to appear when the counted value of the timer circuit is a value later than the pulse signal which is transmitted from the transmitter, that is, after a time corresponding to the propagation time of the pulse signal elapses. The two generated pulse signals are divided into predetermined voltage values by a voltage divider circuit and a set of pulse signals which simulate various fluid velocities of the liquid measured by the sensor 1 are generated. The simulated signal generating circuit 20 outputs the generated set of pulse signals as the simulated measurement signal.

When the field device 100 is a temperature transmitter or, for example, a level meter of temperature or pressure, the sensor 1 includes a temperature sensor that measures a temperature or a pressure sensor that measures a pressure. The sensor 1 outputs a voltage signal of a voltage value indicating the measured temperature or pressure as a measurement signal to the buffer circuit 2.

When the field device 100 is a temperature transmitter or a level meter, the sensor driver circuit 5 corresponds to a reference voltage circuit that outputs (supplies) a reference voltage of a predetermined voltage value to the temperature sensor or the pressure sensor of the sensor 1.

When the field device 100 is a temperature transmitter or a level meter, the simulated signal generating circuit 20 outputs a voltage signal of a voltage value which simulates the temperature or the pressure measured by the temperature sensor or the pressure sensor of the sensor 1, as a simulated measurement signal. More specifically, the simulated signal generating circuit 20 divides a voltage signal of a reference voltage value into predetermined voltage values using a voltage divider circuit and generates a voltage signal simulating the temperature or the pressure measured by the sensor 1. The simulated signal generating circuit 20 outputs the generated voltage signal as the simulated measurement signal.

In this way, in the field device 100, the configurations of the sensor 1, the sensor driver circuit 5, and the simulated signal generating circuit 20 vary depending on the type of the field device 100. That is, the field device 100 includes the sensor driver circuit 5 or the simulated signal generating circuit 20 having an appropriate configuration depending on the type of the sensor 1 of the field device 100. In the field device 100, the operations of the elements of the field device 100 are verified using the simulated measurement signal which simulates the measurement signal output from the sensor 1 of the field device 100 and which is output from the simulated signal generating circuit 20. At this time, in the field device 100, the simulated signal generating circuit 20 outputs a simulated measurement signal of a voltage, a current, a time difference, a phase difference, a frequency, and the like simulating the measurement signal output from the sensor 1 depending on the type of the sensor 1 of the field device 100. Accordingly, in the field device 100, the operations of the elements from an input to an output, that is, from the sensor 1 to the output circuit 10, can be verified. Accordingly, in the field device 100, it is possible to enhance coverage of the elements of the field device 100 in verifying the soundness of the field device 100.

The configurations of the sensor 1 and the sensor driver circuit 5, the configuration of the simulated signal generating circuit 20, and the simulated measurement signal output therefrom are only examples and various configurations or simulated measurement signals can be considered depending on the type of the field device 100. Accordingly, the configurations of the sensor 1 and the sensor driver circuit 5, the configuration of the simulated signal generating circuit 20, and the simulated measurement signal output therefrom in the field device 100 are not limited to the above-mentioned configurations or the above-mentioned simulated measurement signals.

Figure 2:
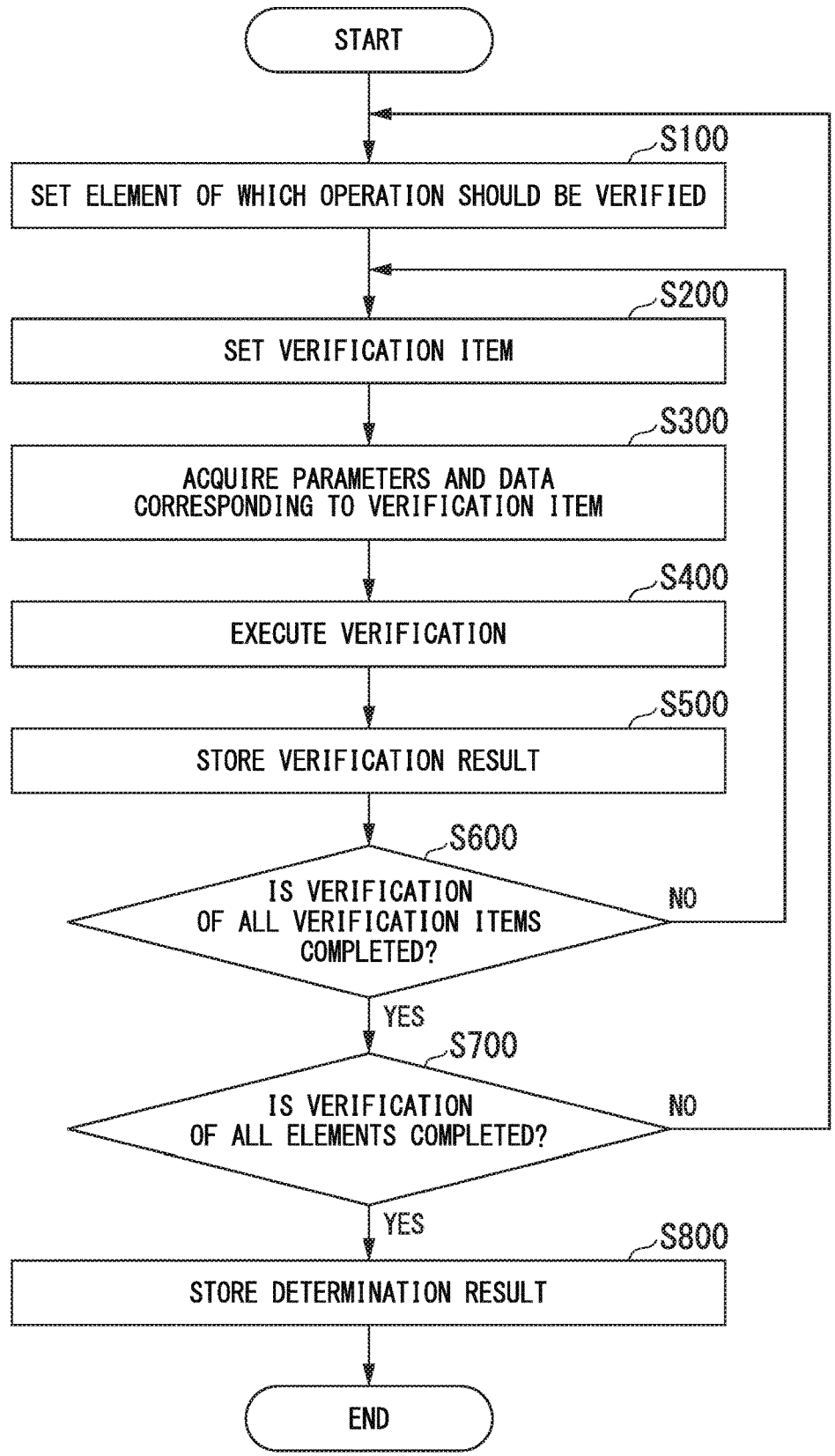
FIG. 2 is a flowchart illustrating an example of a processing flow of a verification process of verifying soundness of the field device according to the embodiment.

A process of verifying the operations of the elements of the field device 100 will be described below. FIG. 2 is a flowchart illustrating an example of a process flow of a verifying process of verifying soundness of the field device 100 according to this embodiment. FIG. 2 illustrates an example of a process of causing the operation verifying unit 61 of the processing unit 6 to verify the operations of the elements of the field device 100 by controlling the elements in accordance with the executed operation verifying program and verifying the soundness of the field device 100 from the results of the operation verification of the elements (verification results). The process of verifying the soundness of the field device 100 in accordance with the operating verifying program, which is illustrated in FIG. 2, is started when the operation and display unit 8 is operated by an operator, a verification executing instruction signal indicating execution of the soundness verification is input from the operation and display unit 8, the processing unit 6 starts the operation verifying unit 61, and the operation verifying program is executed by the operation verifying unit 61.

In the field device 100, information such as a status when the process of verifying the soundness of the field device 100 is performed in accordance with the operation verifying program or a final verification result of the soundness is displayed on the operation and display unit 8 to be presented to the operator. FIGS. 3A to 3D are diagrams illustrating an example of display on the operation and display unit 8 of the field device 100 according to this embodiment. FIGS. 3A to 3D illustrate an example of information which is displayed on the display unit of the operation and display unit 8 by the processing unit 6 while the operation verifying unit 61 is performing the process of verifying the soundness of the field device 100 illustrated in FIG. 2. In the following description, the process flow of the operation verifying unit 61 illustrated in FIG. 2 will be described with reference to the example of the display on the operation and display unit 8 illustrated in FIGS. 3A to 3D.

Figure 3B:
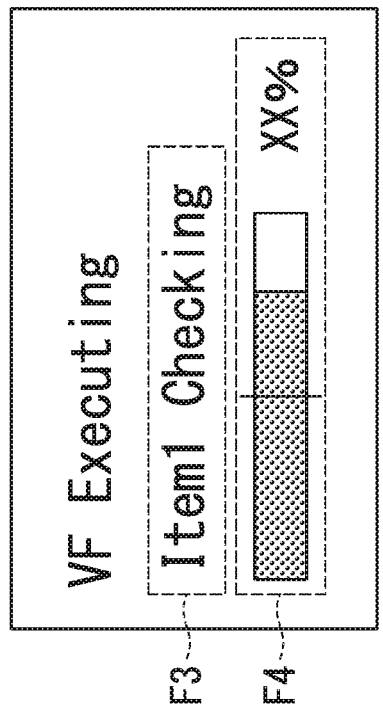
FIGS. 3A to 3D are diagrams illustrating an example of a display of an operation and display unit of the field device according to the present invention.
Figure 3D:
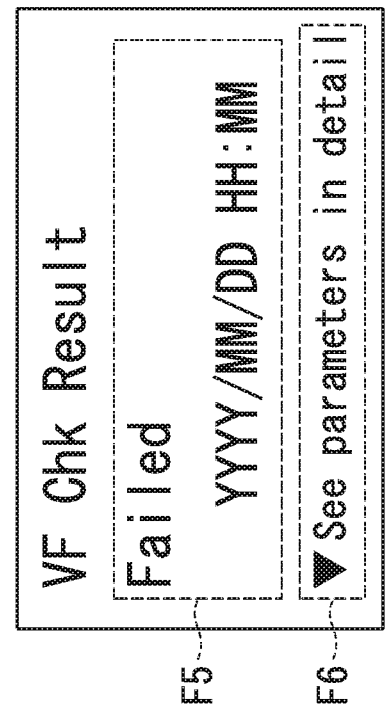
Figure 3A:
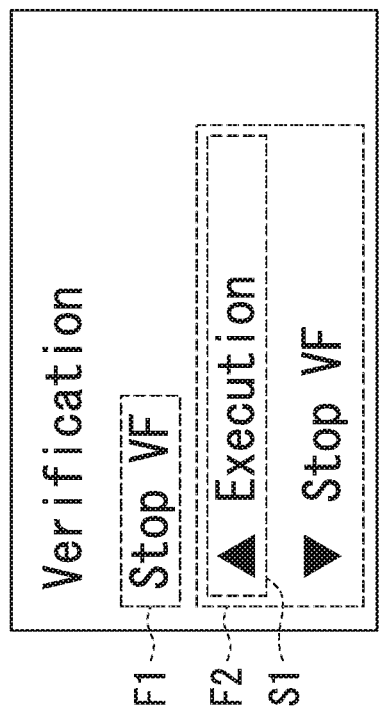

When an operator operates the operation and display unit 8 and changes an operation mode of the field device 100 to an operation mode in which a verifying operation of verifying soundness thereof is performed, the processing unit 6 generates and displays display data for displaying verification mode selection information on the operation and display unit 8 as illustrated in FIG. 3A. In FIG. 3A, an example of the verification mode selection information in which a current status in the verification mode is displayed in a status display area F1 and selection instructions ("Execution" instructing execution of soundness verification and "Stop VF (Verification)" instructing stop of the soundness verification) are displayed in an operation instructing area F2 is illustrated. When the operator selects a soundness verification execution instruction S1 displayed in the operation instructing area F2 in the verification mode selection information illustrated in FIG. 3A, the operation and display unit 8 outputs a verification executing instruction signal to the processing unit 6.

When the verification executing instruction signal instructing execution of the soundness verification is input from the operation and display unit 8, the processing unit 6 starts the operation verifying unit 61 in response to the input verification executing instruction signal, and the operation verifying unit 61 acquires (reads) the operation verifying program stored in the memory 7 and executes the operation verifying program. When the operation verifying program is executed, that is, the verifying process of verifying the soundness of the field device 100 is started, the operation verifying unit 61 first sets an element of which the operation should be verified (Step S100). Subsequently, the operation verifying unit 61 sets a first verification item corresponding to the set element (Step S200).

Subsequently, the operation verifying unit 61 acquires parameters and data required for verifying the set verification item (Step S300). The parameters and data corresponding to the verification item acquired by the operation verifying unit 61 are stored, for example, in a storage unit such as a register of the processing unit 6 or the memory 7. Accordingly, in the process of Step S300, reading of the parameters and data from the storage unit such as a register of the processing unit 6 or the memory 7 is controlled.

Subsequently, the operation verifying unit 61 executes verification of the first verification item corresponding to the set element based on the acquired parameters and data (Step S400). Then, the operation verifying unit 61 stores the process result of Step S400, that is, the acquired verification result of the verification item, in correlation with the current date and time (Step S500). In the field device 100, the verification result of the verification item acquired by the operation verifying unit 61 is stored in the memory 7. Accordingly, in the process of Step S500, writing of data of the verification result to the memory 7 is controlled.

Subsequently, the operation verifying unit 61 determines whether verification of all the verification items corresponding to the set element is completed (Step S600). The verification items for the elements of the field device 100 are determined in advance. Accordingly, the operation verifying unit 61 can perform the process of Step S600 of determining whether verification of all the verification items is completed, for example, based on a counted value which is acquired by counting the number of verification items determined in advance for each element or the like.

When it is determined in Step S600 that verification of all the verification items corresponding to the set element is not completed ("NO" in Step S600), the operation verifying unit 61 sets a next verification item corresponding to the set element in Step S200 and repeatedly performs the processes of Steps S300 to S600.

On the other hand, when it is determined in Step S600 that verification of all the verification items corresponding to the set element is completed ("YES" in Step S600), the operation verifying unit 61 determines whether verification of all the elements of which the operations should be verified is completed (Step S700).

When it is determined in Step S700 that verification of all the elements of which the operations should be verified is not completed ("NO" in Step S700), the operation verifying unit 61 sets a next element of which the operation should be verified in Step S100 and repeatedly performs the processes of Steps S200 to S700.

Between Step S100 and Step S700, the processing unit 6 generates and displays display data for displaying verification execution (VF (Verification) Executing) information on the operation and display unit 8 as illustrated in FIG. 3B. FIG. 3B illustrates an example of the verification execution information in which information of an element of which the operation is currently verified or the like is displayed in a status display area F3 and information of a current progress level (a progress bar graph and a ratio) is displayed in a status display area F4. The processing unit 6 updates the information displayed in the status display area F3 to information of the element set in Step S100 or the verification item set in Step S200, for example, whenever the operation verifying unit 61 performs the process of Step S100 or S200. For example, in a period in which the operation verifying unit 61 performs the processes of Steps S300 to S700, the processing unit 6 calculates a ratio of the current process to the entire verification process and updates the information of the progress bar graph or the ratio displayed in the status display area F4.

On the other hand, as a result of the determination in Step S700, when verification of all the elements of which the operations should be verified is completed ("YES" in Step S700), the operation verifying unit 61 finally determines the soundness of the field device 100 based on the verification results of all the verification items of which the verification is completed. Then, the operation verifying unit 61 stores the determination result (the verification result) in correlation with the current date and time and ends the process of verifying the soundness of the field device 100 (Step S800). In the field device 100, the operation verifying unit 61 stores the determined verification result of the soundness in the memory 7. Accordingly, in the process of Step S800, writing of data of the verification result to the memory 7 is controlled.

Figure 3C:

The processing unit 6 generates and displays display data for displaying the verification result determined by the operation verifying unit 61 in the process of Step S800 on the operation and display unit 8. FIGS. 3C and 3D illustrate an example of information of the verification result (VF (Verification) Chk (Check) Result) which is displayed on the operation and display unit 8 by the processing unit 6. More specifically, FIG. 3C illustrates an example of information of the verification result in which information indicating that the verification result of soundness is "success (Passed)" and information of the date and time at which the verification process is performed are displayed in a verification result area F5. FIG. 3D illustrates an example of verification result information in which information indicating that the verification result of soundness is "failure (Failed)" and information of the date and time at which the verification process is performed are displayed in the verification result area F5 and a message for promoting display of detailed information is displayed in a message area F6. Here, when an operator selects the message displayed in the message area F6 in the verification result information of failure illustrated in FIG. 3D, the operation and display unit 8 outputs information indicating that the message area F6 is selected by the operator to the processing unit 6. Accordingly, the processing unit 6 generates and displays display data for sequentially displaying the verification result for each verification item of each element, which is stored in the memory 7 by the operation verifying unit 61 in the process of Step S500, on the operation and display unit 8.

By this process, in the field device 100, the operation verifying unit 61 of the processing unit 6 performs verification of the operations of the elements of the field device 100 and verification of the soundness of the field device 100 in accordance with the executed operation verifying program and presents the operator the final verification result of soundness. At this time, in the field device 100, the verification results of the operations of the elements and the verification result of the soundness of the field device 100 are stored in the memory 7. Accordingly, in the field device 100, the verification results stored in the memory 7 can be referred to at an arbitrary time by an operator other than the operator performing the checking operation. At this time, the operator referring to the verification results can acquire and refer to the verification results stored in the memory 7 by communication via a communication network which is exclusively constructed in the plant. In the field device 100, the verification results stored in the memory 7 have a small amount of data and thus the operator referring to the verification results can acquire the verification results in a short communication time.

An example of the method of verifying the operations of the elements illustrated in FIG. 1 will be described below. Verification of the operations of the elements of the field device 100 illustrated in FIG. 1 is performed, for example, in the following order.

(Operation Verification 1): The operation verification of an analog-based circuit corresponding to the sensor 1, to which a measurement signal output from the sensor 1 is input and includes the elements from the buffer circuit 2 to the A/D conversion circuit 4 which are included in the path until a digital signal based on the measurement signal is output is performed.

(Operation Verification 2): The operation verification of the sensor 1 is performed.

(Operation Verification 3): The operation verification of a digital-based circuit including the processing unit 6 performing a calculation process on the digital measurement signal is performed.

(Operation Verification 4): The operation verification of the operation and display unit 8 is performed.

(Operation Verification 5): The operation verification of an output-system circuit which is included in a path through which the processing unit 6 outputs a digital signal subjected to the calculation process and which includes the D/A conversion circuit 9 and the output circuit 10 is performed.

(Operation Verification 6): The operation verification of an input-system circuit which is included in a path through which a digital signal corresponding to an input signal input from the outside of the field device 100 is output to the processing unit 6 and which includes the input circuit 11 and the A/D conversion circuit 12 is performed.

First, the method of verifying the operation of the analog-based circuit in Operation Verification 1 will be described below. In the operation verification of the analog-based circuit, accuracy of the process of converting the measurement signal output from the sensor 1 into a digital measurement signal or the like is verified using the simulated measurement signal output from the simulated signal generating circuit 20. More specifically, the operation verifying unit 61 of the processing unit 6 causes the simulated signal generating circuit 20 to generate one type or plural types of simulated measurement signals which simulate a voltage, a current, a time difference, a phase difference, a frequency, and the like output as the measurement signal from the sensor 1 of the field device 100 and to input the generated measurement signals to the buffer circuit 2 via the signal switch 21. Then, the operation verifying unit 61 compares a digital value corresponding to the signal level of the simulated measurement signal and indicated by the digital measurement signal output from the A/D conversion circuit 4 with a digital value assumed by the simulated measurement signal output from the simulated signal generating circuit 20, and determines whether the digital value output from the A/D conversion circuit 4 is in a digital value range determined in advance for the assumed digital value, that is, in a predetermined threshold range. When it is determined that the digital value output from the A/D conversion circuit 4 is in the predetermined threshold range, it is determined that the conversion accuracy into the digital measurement signal in the analog-based circuit is normal, and the result of the operation verification of the analog-based circuit is determined to be "success." On the other hand, when it is determined that the digital value output from the A/D conversion circuit 4 is not in the predetermined threshold range, it is determined that the conversion accuracy into the digital measurement signal in the analog-based circuit is abnormal, and the result of the operation verification of the analog-based circuit is determined to be "failure."

Subsequently, the method of verifying the operation of the sensor 1 in Operation Verification 2 will be described below. In the operation verification of the sensor 1, open or short or the like in the circuit of the sensor 1 is verified. In the operation verification of the sensor 1, for example, a DC signal or an AC signal (hereinafter, referred to as a "verification signal") is applied to the sensor 1, and measurement for verifying the quality of the operation of the sensor 1, such as an insulating resistance value or a capacitance value of the sensor 1 is performed from a signal which is acquired in response to the applied verification signal. More specifically, the operation verifying unit 61 causes the sensor driver circuit 5 to apply a verification signal to the sensor 1. Accordingly, a signal based on the verification signal is output as a measurement signal from the sensor 1. Then, the operation verifying unit 61 compares a digital value corresponding to the signal level of the verification signal and indicated by the digital measurement signal output from the A/D conversion circuit 4 with a digital value assumed by the verification signal applied to the sensor driver circuit 5, and determines whether the digital value output from the A/D conversion circuit 4 is in a digital value range (threshold range) determined in advance for the assumed digital value. The determination of whether the operation of the sensor 1 is normal or abnormal based on the determination result is the same as in the operation verification of the analog-based circuit in Operation Verification 1. That is, when the digital value output from the A/D conversion circuit 4 is in the predetermined threshold range, it is determined that the operation of the sensor 1 is normal, and the result of the operation verification thereof is determined to be "success." When the digital value output from the A/D conversion circuit 4 is not in the predetermined threshold range, it is determined that the operation of the sensor 1 is abnormal, and the result of the operation verification thereof is determined to be "failure." Operation Verification 2, that is, the verification of open or short in the circuit of the sensor 1, may be performed by checking the signal level of a drive signal of the sensor 1 output from the sensor driver circuit 5.

Subsequently, the method of verifying the operation of the digital-based circuit in Operation Verification 3 will be described below. In the operation verification of the digital-based circuit, an abnormal operation (runway of processes) of the processing unit 6 due to a watchdog timer circuit (not illustrated) of the processing unit 6 or recording abnormality (such as a bit error) of the storage unit is verified. For example, the operation verifying unit 61 may detect a time of a process which is performed by the processing unit 6 by measuring an operating time of a timer circuit used for the processing unit 6 to perform a measuring operation using another timer circuit of the processing unit 6 and checking the measured time. In Operation Verification 3, that is, the operation verification of the digital-based circuit including the processing unit 6, the method of detecting the abnormal operation of the processing unit 6 or the recording abnormality of the storage unit is not limited to the above-mentioned method, but various methods using existing detection techniques can be considered.

Subsequently, the method of verifying the operation of the operation and display unit 8 in Operation Verification 4 will be described below. In the operation verification of the operation and display unit 8, a lifespan of the display unit of the operation and display unit 8 or the like is verified. The lifespan of the display unit can be generally calculated based on the temperature and the operating time. For example, the operation verifying unit 61 calculates (predicts) the lifespan of the display unit based on the temperature measured by a temperature measuring function of the field device 100 and the operating time measured by a timepiece function of the field device 100. Then, the operation verifying unit 61 compares the calculated lifespan of the display unit with a predetermined lifespan of the display unit, and determines whether the calculated lifespan of the display unit is greater than the predetermined lifespan of the display unit. When it is determined that the calculated lifespan of the display unit is not greater than the predetermined lifespan of the display unit, it is determined that the display on the display unit of the operation and display unit 8 is normal, and the result of the operation verification of the operation and display unit 8 is determined to be "success." When the calculated lifespan of the display unit is greater than the predetermined lifespan of the display unit, it is determined that there is a high possibility that the display on the display unit of the operation and display unit 8 will be abnormal, and the result of the operation verification of the operation and display unit 8 is determined to be "failure."

Subsequently, the method of verifying the operation of the output-system circuit in Operation Verification 5 will be described below. In the operation verification of the output-system circuit, it is verified whether an output signal (an analog signal) corresponding to the digital signal output from the processing unit 6 using the A/D conversion circuit 13 is correctly output to the outside of the field device 100 or the like. That is, in the operation verification of the output-system circuit, a range (for example, a range of 4 mA to 20 mA) of a DC analog signal output from the output-system circuit is verified. More specifically, the operation verifying unit 61 of the processing unit 6 controls a switch (not illustrated) to input the output signal output from the output circuit 10 to the A/D conversion circuit 13. Then, the operation verifying unit 61 outputs a pseudo digital signal of a digital value corresponding to the magnitude of the DC analog signal output from the output-system circuit to the D/A conversion circuit 9. Accordingly, the DC analog signal corresponding to the digital signal output from the operation verifying unit 61 is output from the output circuit 10, and the DC analog signal is input to the A/D conversion circuit 13. Then, the A/D conversion circuit 13 converts the DC analog signal (the output signal) input from the output circuit 10 in an analog-digital conversion manner and outputs a digital signal of a digital value corresponding to the signal level of the DC analog signal to the processing unit 6. That is, in the operation verification of the output-system circuit in Operation Verification 5, the pseudo digital signal output from the operation verifying unit 61 is returned to the operation verifying unit 61 via the D/A conversion circuit 9, the output circuit 10, and the A/D conversion circuit 13. Then, the operation verifying unit 61 compares the digital value of the digital signal output from the A/D conversion circuit 13 with the digital value of the output pseudo digital signal, and determines whether the digital value output from the A/D conversion circuit 13 is the same digital value as the digital value of the output pseudo digital signal. When it is determined that the digital values are the same digital value, it is determined that the DC analog signal output from the output-system circuit is normal, and the result of the operation verification thereof is determined to be "success." When the digital values are not the same digital value, that is, when the digital values are different, it is determined that the DC analog signal output from the output-system circuit is abnormal, and the result of the operation verification thereof is determined to be "failure."

In the operation verification of the output-system circuit in Operation Verification 5, the operation verifying unit 61 may be configured to determine whether the digital value output from the A/D conversion circuit 13 is in a predetermined digital value range (threshold range) from the digital value of the output pseudo digital signal. In this case, the operation verifying unit 61 determines that the result of the operation verification of the output-system circuit is "success" when the digital value output from the A/D conversion circuit 13 is in the predetermined threshold range, and determines that the result of the operation verification of the output-system circuit is "failure" when the digital value output from the A/D conversion circuit 13 is not in the predetermined threshold range. In the operation verification of the output-system circuit in Operation Verification 5, for example, a configuration in which a resistor of a predetermined resistance value is connected in series to the output signal may be disposed inside or outside the output circuit 10 and it may be determined whether the output signal is a DC analog signal of a correct current value by measuring a voltage of the resistor.

Subsequently, the method of verifying the operation of the input-system circuit in Operation Verification 6 will be described below. In the operation verification of the input-system circuit, it is verified whether an input signal (an analog signal) input from the outside of the field device 100 is correctly input using the output-system circuit. That is, in the operation verification of the input-system circuit, a range (for example, a range of 4 mA to 20 mA) of a DC analog signal input to the input-system circuit is verified. More specifically, the operation verifying unit 61 of the processing unit 6 controls a switch (not illustrated) to input the output signal output from the output circuit 10 to the input circuit 11. Then, the operation verifying unit 61 outputs a pseudo digital signal of a digital value corresponding to the magnitude of the DC analog signal output from the output-system circuit to the D/A conversion circuit 9, and causes the output circuit 10 to output the DC analog signal corresponding to the digital signal output from the operation verifying unit 61. Accordingly, the DC analog signal, which is output from the output circuit 10, corresponding to the digital signal output from the operation verifying unit 61 is input to the input circuit 11, and the DC analog signal is output to the A/D conversion circuit 12. Then, the A/D conversion circuit 12 converts the DC analog signal (the input signal) output from the input circuit 11 in an analog-digital conversion manner and outputs a digital signal of a digital value corresponding to the signal level of the DC analog signal to the processing unit 6. That is, in the operation verification of the input-system circuit in Operation Verification 6, the pseudo digital signal output from the operation verifying unit 61 is returned to the operation verifying unit 61 via the D/A conversion circuit 9, the output circuit 10, the input circuit 11, and the A/D conversion circuit 12. Then, the operation verifying unit 61 compares the digital value of the digital signal output from the A/D conversion circuit 12 with the digital value of the output pseudo digital signal, and determines whether the digital value output from the A/D conversion circuit 12 is the same digital value as the digital value of the output pseudo digital signal. The determination of whether the operation of the input-system circuit is normal or abnormal based on the determination result is the same as in the operation verification of the output-system circuit in Operation Verification 5. That is, when it is determined that the digital value of the digital signal output from the A/D conversion circuit 12 and the digital value of the output pseudo digital signal are the same digital value, it is determined that the operation of the input-system circuit is normal, and the result of the operation verification thereof is determined to be "success." When the digital values are different digital values, it is determined that the operation of the input-system circuit is abnormal, and the result of the operation verification thereof is determined to be "failure."

In the operation verification of the input-system circuit in Operation Verification 6, since the operation verification is performed using the pseudo digital signal returned to the operation verifying unit 61 as described above, it may be thought that the operation verification of the output-system circuit is simultaneously performed. Accordingly, the order of performing the operation verification of the elements of the field device 100 may be changed. More specifically, the order may be changed to first perform the operation verification of the input-system circuit in Operation Verification 6 and then to perform the operation verification of the output-system circuit in Operation Verification 5. Accordingly, at a time point at which the operation verification of the input-system circuit in Operation Verification 6 ends, the operation verification of the output-system circuit also ends. When the result of the operation verification of the input-system circuit in Operation Verification 6 is "failure," the operation verification of the output-system circuit in Operation Verification 5 may be performed for the purpose of checking whether the reason of the failure is in the input-system circuit or the output-system circuit. That is, when the result of the operation verification of the input-system circuit in Operation Verification 6 is "success," the operation verification of the output-system circuit in Operation Verification 5 may not be performed In the operation verification of the input-system circuit in Operation Verification 6, similar to the operation verification of the output-system circuit in Operation Verification 5, it may be determined whether the digital value of the digital signal output from the A/D conversion circuit 12 is in a predetermined digital value range (threshold range) from the digital value of the output pseudo digital signal. In the operation verification of the input-system circuit in Operation Verification 6, for example, a configuration in which a reference voltage of a predetermined voltage value is connected to the input signal may be disposed inside or outside the input circuit 11 and it may be determined whether a digital signal of a digital value corresponding to the reference voltage is output from the A/D conversion circuit 12.

When the field device 100 includes the output-system circuit and the input-system circuit as illustrated in FIG. 1, the operation verification of the output-system circuit in Operation Verification 5 and the operation verification of the input-system circuit in Operation Verification 6 may be performed using a device outside the field device 100, such as a controller connected to the field device 100, via the communication network. More specifically, the field device 100 outputs the output signal (the DC analog signal) corresponding to the pseudo digital signal, which is output from the operation verifying unit 61, from the output circuit 10 to the external device and the external device inputs the input signal (the DC analog signal) indicating the received output signal to the input circuit 11 of the field device 100. Then, the operation verifying unit 61 performs the operation verification of the output-system circuit and the operation verification of the input-system circuit by comparing the digital value of the output pseudo digital signal with the digital value output from the A/D conversion circuit 12.

In the field device 100, it can also be considered that the operation verification of a power supply circuit which is not illustrated (for example, a voltage value output from the power supply circuit) is performed. In the operation verification of the power supply circuit, for example, a voltage value of a primary-side or secondary-side power supply of the power supply circuit is converted into a digital value by an A/D conversion circuit which is not illustrated and the converted digital value is in a predetermined digital value range, that is, a predetermined voltage value threshold range. In the operation verification of the power supply circuit, for example, it is determined whether a voltage value of a primary-side or secondary-side power supply of the power supply circuit is a voltage value within a predetermined range (threshold range) by a comparison circuit (comparator) which is not illustrated. The operation verification of the power supply circuit may be performed earlier than the operation verification of the analog-based circuit in Operation Verification 1.

According to these configurations and processes, in the field device 100, the operations of the elements of the field device 100 are verified and the soundness of the field device 100 is finally determined (verified) based on the results of the operation verification of the elements, in accordance with the operation verifying program executed by the operation verifying unit 61 of the processing unit 6. In the field device 100, the final verification result of soundness is presented to an operator. In the field device 100, by storing various verification results including the results of the executed operation verification (the verification results) in the memory 7, an operator other than the operator having performed the checking operation can refer to the verification results stored in the memory 7 at an arbitrary time.

The operation verification of the elements in the field device 100 can be performed in various stages (times) such as a stage in which the field device 100 is shipped, a stage in which installation (instrumentation) of the field device 100 in the facility is performed, and a stage in which periodical check is performed in a state in which the field device 100 is operating. In the field device 100, as described above, the verification results (the inspection data, confirmation data, check data, and maintenance data) in the stages are stored in the memory 7. Accordingly, in the field device 100, in addition to verification of whether the result of the operation verification which is currently executed is in a prescribed range (for example, a standard value range for each element) determined in advance for the operation of each element, it is possible to verify the soundness of the field device 100 by comparing the result of the current operation verification with the verification results stored in the memory 7.

For example, by verifying whether a deviation between the inspection data acquired in the stage in which the field device 100 is shipped and the result of the current operation verification is in a predetermined range, it is possible to verify the soundness of the field device 100. For example, by verifying whether a deviation between the confirmation data acquired in the stage in which first installation (instrumentation) of the field device 100 is performed and the result of the current operation verification is in a predetermined range, it is possible to verify the soundness of the field device 100. For example, by verifying whether a deviation between the check data acquired in the previous checking operation when the field device 100 operates and the result of the operation verification acquired in the current checking operation is in a predetermined range, it is possible to verify the soundness of the field device 100.

In the field device 100, various verifications such as the verification of soundness based on the predetermined prescribed range, the verification of soundness based on the inspection data at the time of shipment, the verification of soundness based on the check data at the time of first installation (instrumentation), the verification of soundness based on the check data acquired in the previous checking operation can be performed, but one or more verifications of soundness may be performed. For example, by performing both the verification of soundness based on the inspection data at the time of shipment and the verification of soundness based on the confirmation data at the time of first installation (instrumentation), a deteriorated state or a deterioration progress state of each element of the field device 100 can be verified before it is determined that it is determined to be failure in the verification of soundness based on the predetermined prescribed range. Accordingly, the field device 100 may be configured to notify an operator of a warning indicating that repair (maintenance) is required beforehand. Accordingly, it is possible to perform repair (maintenance) of the field device 100 beforehand.

In general, in a sensor, an A/D conversion circuit, a D/A conversion circuit, and an output circuit, for example, correction using a correction coefficient for correcting linearity is performed on a signal to be output. In the field device 100, it is possible to perform verification of a deviation from a previous state such as the verification of soundness based on the inspection data at the time of shipment or the verification of soundness based on the confirmation data at the time of first installation (instrumentation). Accordingly, the field device 100 may be configured to calculate a new correction coefficient based on the verification result of the deviation and to employ (set) the calculated new correction coefficient as a correction coefficient used for each element to output a signal. Accordingly, in the field device 100, it is possible to more accurately measure an operating status when an installed facility operates.

It is preferable that the operation verification of the elements of the field device 100 be performed in a state in which the installed facility is not controlled by the field device 100. However, it may be intended to perform the operation verification of the elements of the field device 100 in a state in which the facility is controlled by the field device. In this case, it is preferable that the operation verification which may hinder a normal measuring operation in the field device 100, such as the operation verification of the analog-based circuit using the simulated measurement signal output from the simulated signal generating circuit 20, be skipped to simply perform the operation verification of the elements. For example, in the normal measuring operation in the field device 100, when the field device intermittently controls the facility, the operation verification of the analog-based circuit using the simulated signal generating circuit 20 may be performed in a period in which or at a time at which a normal measuring operation of causing the field device 100 to control the facility is not performed by the sensor 1. In this case, for example, each verification item for verifying the operation of the analog-based circuit may be divided in a plurality of periods in which the normal measuring operation is not performed, that is, the normal measuring operation and the operation verification of the analog-based circuit in the field device 100 may be alternately performed.

<Specific Example of Field Device>

Figure 4:
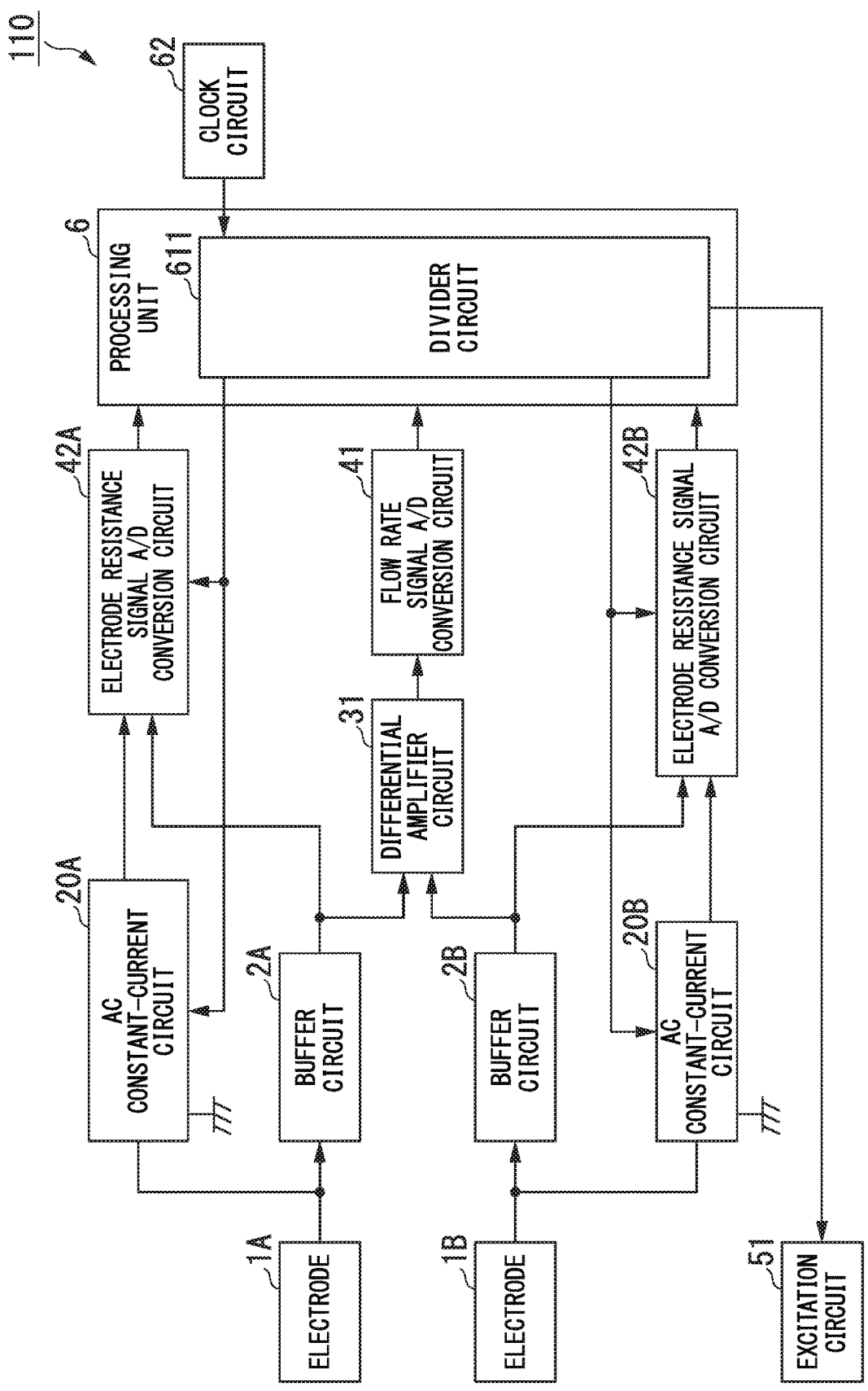
FIG. 4 is a block diagram schematically illustrating a configuration of a specific example of the field device according to the embodiment.

A specific example of the field device 100 in which the operations of the elements are verified will be described below. FIG. 4 is a block diagram illustrating a schematic configuration of a specific example of the field device 100 according to this embodiment. In FIG. 4, a schematic configuration when the field device 100 is an electromagnetic flow meter is illustrated. In the following description, the field device 100 illustrated in FIG. 4 is referred to as an "electromagnetic flow meter 110." The electromagnetic flow meter 110 is configured to include elements corresponding to the field device 100 illustrated in FIG. 1. Accordingly, in the following description, the elements of the electromagnetic flow meter 110 corresponding to the elements of the field device 100 illustrated in FIG. 1 will be referenced by the same reference signs. In FIG. 4, only the elements associated with the operation verification of the analog-based circuit and the sensor 1 in the electromagnetic flow meter 110, that is, Operation Verification 1 and Operation Verification 2 are illustrated, and the other elements are not illustrated.

The electromagnetic flow meter 110 is installed in a pipe disposed in a plant, measures a flow rate (a fluid velocity) of a conductive liquid flowing in the disposed pipe, and outputs an output signal (a DC analog signal) indicating the measured flow rate to the outside of the electromagnetic flow meter 110, such as a controller. The electromagnetic flow meter 110 includes an electrode 1A, an electrode 1B, a buffer circuit 2A, a buffer circuit 2B, a differential amplifier circuit 31, a flow rate signal A/D conversion circuit 41, an electrode resistance signal A/D conversion circuit 42A, an electrode resistance signal A/D conversion circuit 42B, an excitation circuit 51, a processing unit 6, a clock circuit 62, an AC constant-current circuit 20A, and an AC constant-current circuit 20B. The processing unit 6 includes a divider circuit 611.

The excitation circuit 51 is an excitation circuit configured to output an excitation current required for forming a magnetic field in an excitation coil included in a magnetic circuit of a sensor 1. The excitation circuit 51 outputs an excitation current based on a time signal output from the divider circuit 611 of the processing unit 6 to the excitation coil in response to a control signal input from an operation verifying unit 61 (not illustrated) of the processing unit 6.

Each of the electrodes 1A and 1B is an electrode to which one electrode of a pair of electrodes of the sensor 1 is connected. Accordingly, the electrodes 1A and 1B correspond to the pair of electrodes of the sensor 1. Each of the electrodes 1A and 1B outputs a voltage signal of a voltage value corresponding to the flow rate of a liquid measured by the sensor 1, that is, a voltage signal having a magnitude of an electromotive force which is generated by the liquid flowing in the magnetic field formed by the excitation coil based on the excitation current output from the excitation circuit 51, as a measurement signal.

Each of the buffer circuits 2A and 2B is a buffer circuit that transmits the measurement signal output from the sensor 1 to the corresponding electrode 1A or 1B to the differential amplifier circuit 31, the electrode resistance signal A/D conversion circuit 42A, and the electrode resistance signal A/D conversion circuit 42B. Each of the buffer circuits 2A and 2B corresponds to the buffer circuit 2 in the field device 100.

The differential amplifier circuit 31 takes a difference between the measurement signals output from the buffer circuits 2A and 2B, amplifies signal levels of the measurement signals between which the difference is taken, and outputs the amplified measured signals as analog measurement signals. By causing the differential amplifier circuit 31 to take the difference between the measurement signals, the electromagnetic flow meter 110 can remove an in-phase noise component included in the measurement signal acquired from the sensor 1. The differential amplifier circuit 31 corresponds to the amplification and band limiting circuit 3 in the field device 100.

The flow rate signal A/D conversion circuit 41 outputs a digital measurement signal, which is obtained by converting the analog measurement signal (an analog signal) output from the differential amplifier circuit 31 in an analog-digital conversion manner, to the processing unit 6. The digital measurement signal output from the flow rate signal A/D conversion circuit 41 is output as a measurement signal, which is acquired by the electromagnetic flow meter 110 in a normal measuring operation, to the outside of the electromagnetic flow meter 110 such as a controller and is used to control an operation of a facility in which the electromagnetic flow meter 110 is installed. The digital measurement signal output from the flow rate signal A/D conversion circuit 41 is also used to verify operations of an analog-based circuit and the sensor 1 in the electromagnetic flow meter 110.

Each of the electrode resistance signal A/D conversion circuit 42A and the electrode resistance signal A/D conversion circuit 42B converts the measurement signal (an analog signal) output from the corresponding buffer circuit 2A or 2B in an analog-digital conversion manner at a time based on the time signal output from the divider circuit 611 of the processing unit 6 and outputs a digital signal of a digital value corresponding to the signal level (a voltage value) of the measurement signal output from the terminals of the sensor 1 to the processing unit 6. Each of the electrode resistance signal A/D conversion circuit 42A and the electrode resistance signal A/D conversion circuit 42B converts an AC current signal (an analog signal) output from the corresponding AC constant-current circuit 20A or 20B in an analog-digital conversion manner at a time based on the time signal output from the divider circuit 611 of the processing unit 6 and outputs a digital signal of a digital value corresponding to the signal level (a voltage value) of the AC current signal to the processing unit 6. The digital signals output from the electrode resistance signal A/D conversion circuit 42A and the electrode resistance signal A/D conversion circuit 42B are used to verify the operations of the analog-based circuit and the sensor 1 in the electromagnetic flow meter 110.

In the electromagnetic flow meter 110, each of the flow rate signal A/D conversion circuit 41, the electrode resistance signal A/D conversion circuit 42A, and the electrode resistance signal A/D conversion circuit 42B corresponds to the A/D conversion circuit 4 in the field device 100.

The clock circuit 62 generates a clock and supplies a signal of the generated clock as a clock signal with which the processing unit 6 operates to the processing unit 6. The clock signal supplied from the clock circuit 62 to the processing unit 6 may include a plurality of clock signals such as a signal of a generated original clock and a signal of a divided clock acquired by dividing the original clock.

The processing unit 6 operates based on the clock signal supplied from the clock circuit 62 and controls elements of the electromagnetic flow meter 110. The processing unit 6 verifies the operations of the elements of the electromagnetic flow meter 110 and determines soundness thereof. In the electromagnetic flow meter 110 illustrated in FIG. 4, the divider circuit 611 of the processing unit 6 is illustrated as a part of an element corresponding to the operation verifying unit 61 in the field device 100. The operation verifying unit 61 disposed in the processing unit 6 of the electromagnetic flow meter 110 does not include only the divider circuit 611, but may include various elements (not illustrated) of the processing unit 6, that is, various elements (circuit elements, functional elements, and processing elements) for executing the operation verifying program.

The divider circuit 611 divides the clock signal input from the clock circuit 62 and outputs a time signal based on the divided clock signal to the excitation circuit 51, the electrode resistance signal A/D conversion circuit 42A, the electrode resistance signal A/D conversion circuit 42B, the AC constant-current circuit 20A, and the AC constant-current circuit 20B.

Each of the AC constant-current circuit 20A and the AC constant-current circuit 20B outputs an AC constant-current signal based on the time signal output from the divider circuit 611 of the processing unit 6 to between the corresponding electrode 1A or 1B and the pipe in which the flow rate of the fluid flowing therein is measured, that is, the disposed pipe, in response to the control signal input from the operation verifying unit 61 (not illustrated) of the processing unit 6. That is, each of the AC constant-current circuit 20A and the AC constant-current circuit 20B outputs a current of a current value based on the control signal input from the operation verifying unit 61 (not illustrated) to between the corresponding electrode 1A or 1B and the pipe (a ground level) (that is, the current is caused to flow therebetween). Each of the AC constant-current circuit 20A and the AC constant-current circuit 20B corresponds to the simulated signal generating circuit 20 in the field device 100.

In the electromagnetic flow meter 110, the electrodes 1A and the electrode 1B are verified based on the measurement signals (voltage signals) which are measured and output to the electrodes 1A and 1B by the sensor 1 when the AC constant-current circuit 20A or the AC constant-current circuit 20B outputs a constant current.

An example of the method of verifying the electrode 1A and the electrode 1B in the electromagnetic flow meter 110 will be described below. The verification of the electrode 1A and the electrode 1B is one verification item included in the operation verification (Operation Verification 2) of the sensor 1 which is performed in the electromagnetic flow meter 110. In the following description, it is assumed that the excitation circuit 51 outputs the excitation current based on the time signal output from the divider circuit 611 to the excitation coil in response to the control signal input from the operation verifying unit 61 (not illustrated). In the following description, it is assumed for the purpose of convenience of explanation that the processing unit 6 executes the operation verifying program to verify the operation of the sensor 1.

In the verification of the electrode 1A and the electrode 1B, first, a resistance value of a liquid (hereinafter, referred to as a "reference resistance value") flowing between each electrode and the pipe (the ground level) is calculated based on the measurement signal acquired from the sensor 1 when an AC current of a reference current value flows (hereinafter, referred to as a "reference current"). Subsequently, a resistance value of a liquid (hereinafter, referred to as a "measured resistance value") flowing between each electrode and the pipe (the ground level) is calculated based on the measurement signal acquired from the sensor 1 when an AC current of a current value other than the reference current value flows (hereinafter, referred to as a "measured current"). Thereafter, an AC current ratio and a measurement signal ratio or a resistance value ratio are compared and it is determined (decided) whether each electrode is normal or abnormal based on a deviation between the ratios.

First, verification of the electrode 1A will be described in more detail. First, the AC constant-current circuit 20A outputs a reference current (hereinafter referred to as a "reference current Ia1") with the reference current value set by the control signal input from the operation verifying unit 61 (not illustrated) and a period of the time signal output from the divider circuit 611 to between the corresponding electrode 1A and the pipe (the reference current is made to flow therebetween). Accordingly, a measurement signal (a voltage signal) with the magnitude of an electromotive force (a voltage value which is hereinafter referred to as a "voltage value Va1") corresponding to the reference current Ia1 generated by the liquid flowing the pipe is output from the sensor 1 to the electrode 1A. Then, the buffer circuit 2A outputs the measurement signal output to the electrode 1A from the sensor 1 to the electrode resistance signal A/D conversion circuit 42A, and the electrode resistance signal A/D conversion circuit 42A outputs a digital signal corresponding to the signal level of the measurement signal output from the buffer circuit 2A to the processing unit 6. The electrode resistance signal A/D conversion circuit 42A outputs a digital signal corresponding to the current value of the reference current Ia1 output from the AC constant-current circuit 20A to the processing unit 6. Accordingly, the processing unit 6 calculates a reference resistance value (hereinafter referred to as a "reference resistance value Ra1") of the liquid flowing between the electrode 1A and the pipe (the ground level) when the reference current Ia1 is output (is made to flow) based on the current value of the reference current Ia1 and the signal level of the measurement signal (that is, the voltage value Va1) which are indicated by the digital signals output from the electrode resistance signal A/D conversion circuit 42A. When the reference resistance value Ra1 is calculated, it is generally preferable that the reference resistance value be calculated after linearity correction which is performed on the sensor 1, the buffer circuit 2A, and the electrode resistance signal A/D conversion circuit 42A is applied beforehand.

Subsequently, the AC constant-current circuit 20A outputs a measured current (hereinafter referred to as a "measured current Ia2") with a current value other than the reference current Ia1 set by the control signal input from the operation verifying unit 61 (not illustrated) and a period of the time signal output from the divider circuit 611 to between the corresponding electrode 1A and the pipe (the measured current is made to flow therebetween). Accordingly, similar to when the reference current Ia1 is output (is made to flow), a measurement signal (a voltage signal) with the magnitude of an electromotive force (a voltage value which is hereinafter referred to as a "voltage value Va2") corresponding to the measured current Ia2 generated by the liquid flowing the pipe is output from the sensor 1 to the electrode 1A. Then, the buffer circuit 2A and the electrode resistance signal A/D conversion circuit 42A operate in the same way as when the reference current Ia1 is output (is made to flow) and output a digital signal indicating the voltage value Va2 to the processing unit 6. The electrode resistance signal A/D conversion circuit 42A outputs a digital signal corresponding to the current value of the measured current Ia2 output from the AC constant-current circuit 20A to the processing unit 6. Accordingly, the processing unit 6 calculates a measured resistance value (hereinafter referred to as a "measured resistance value Ra2") of the liquid flowing between the electrode 1A and the pipe (the ground level) when the measured current Ia2 is output (is made to flow) based on the current value of the measured current Ia2 and the voltage value Va2 which are indicated by the digital signals output from the electrode resistance signal A/D conversion circuit 42A. When the measured resistance value Ra2 is calculated, it is generally preferable that the reference resistance value be calculated after linearity correction which is performed on the sensor 1, the buffer circuit 2A, and the electrode resistance signal A/D conversion circuit 42A is applied beforehand, similar to when the reference resistance value Ra1 is calculated.

Thereafter, the processing unit 6 calculates a ratio of the current value of the reference current Ia1 and the current value of the measured current Ia2 using Equation (1). The processing unit 6 calculates a ratio of the voltage value Va1 and the voltage value Va2 using Equation (2).

$$Ia = Ia1/Ia2 \qquad (1)$$

$$Va = Va1/Va2 \qquad (2)$$

In Equation (1), Ia denotes a ratio of the current values of the AC constant-current signals (hereinafter referred to as a "current value ratio") output from the AC constant-current circuit 20A. In Equation (2), Va denotes a ratio of the magnitudes of the electromotive forces (voltage values) (hereinafter referred to as a "voltage value ratio") generated to correspond to the AC constant-current signals. The processing unit 6 determines whether a difference between the current value ratio Ia and the voltage value ratio Va is in a predetermined ratio deviation threshold range, and determines (decides) whether the electrode 1A is normal based on the determination result. For example, it is determined that the electrode 1A is normal when the difference between the current value ratio Ia and the voltage value ratio Va is less than 2%, it is determined that the electrode 1A is abnormal when the difference is greater than 2%.

In determining whether the electrode 1A is normal, the difference between the current value ratio Ia calculated using Equation (1) and the voltage value ratio Va calculated using Equation (2) is compared with the predetermined ratio deviation threshold range. However, the method of determining whether the electrode 1A is normal is not limited to the above-mentioned method. For example, the reference resistance value Ra1 and the measured resistance value Ra2 may be compared and it may be determined whether the electrode 1A is normal depending on whether the difference between the reference resistance value Ra1 and the measured resistance value Ra2 is in a predetermined resistance value deviation threshold range. Here, the reference resistance value Ra1 and the measured resistance value Ra2 are resistance values which are calculated based on the measurement signals acquired when the same liquid flows between the electrode 1A and the pipe (the ground level) with the current value of the AC current changed, that is, when the reference current Ia1 is output (is made to flow) and when the measured current Ia2 is output (is made to flow). Accordingly, when the electrode 1A is normal, the reference resistance value Ra1 and the measured resistance value Ra2 are predicted to have the same value. Accordingly, when the difference between the reference resistance value Ra1 and the measured resistance value Ra2 is large, it is possible to determine that the electrode 1A is abnormal.

In verification of the electrode 1A, it is determined whether the electrode 1A is normal by outputting two currents of the reference current Ia1 and the measured current Ia2 to between the electrode 1A and the pipe (two currents are made to flow therebetween). However, linearity of the measurement signal (the voltage signal) acquired from the sensor 1 may be determined by outputting the current value of the measured current Ia2 to between the electrode 1A and the pipe (causing the measured current to flow therebetween) while sequentially changing the current value and sequentially calculating the measured resistance value Ra2 corresponding to the measured current Ia2 based on the measurement signal (the voltage signal) output from the sensor 1. Accordingly, a correction coefficient of linearity correction which is performed on the sensor 1, the buffer circuit 2A, and the electrode resistance signal A/D conversion circuit 42A in the electromagnetic flow meter 110 may be updated. When linearity of the measurement signal (the voltage signal) acquired from the sensor 1 is determined, it is preferable that a sufficient time be secured as an interval at which the current value of the measured current Ia2 output from (flowing by) the AC constant-current circuit 20A is changed. Accordingly, the measured current Ia2 of a different current value which has been previously output does not affect the measurement signal (the voltage value Va2) output from the sensor 1 in response to the measured current Ia2 of the current which is currently output, that is, it is possible to suppress a measurement variation of the voltage value Va2 between the measured currents Ia2. Accordingly, the processing unit 6 can obtain the measurement signal (the voltage value Va2) which is acquired in a state in which the sensor 1 is stabilized and can more accurately calculate the measured resistance value Ra2 of the electrode 1A.

Now, verification of the electrode 1B will be described in more detail. The verification of the electrode 1B can be considered to be the same as the verification of the electrode 1A. That is, the AC constant-current circuit 20B outputs a reference current (hereinafter referred to as a "reference current Ib1") with the reference current value set by the control signal input from the operation verifying unit 61 (not illustrated) and the period of the time signal output from the divider circuit 611 to between the corresponding electrode 1B and the pipe (the reference current is made to flow therebetween). A reference resistance value (hereinafter referred to as a "reference resistance value Rb1") of the liquid flowing between the electrode 1B and the pipe (the ground level) when the reference current Ib1 is output (is made to flow) is calculated based on the measurement signal (the voltage signal) of a voltage value (hereinafter referred to as a "voltage value Vb1") output from the sensor 1 to the electrode 1B. The AC constant-current circuit 20B outputs a measured current (hereinafter referred to as a "measured current Ib2") with a current value other than the reference current Ib1 to between the corresponding electrode 1B and the pipe (the reference current is made to flow therebetween). A measured resistance value (hereinafter referred to as a "measured resistance value Rb2") of the liquid flowing between the electrode 1B and the pipe (the ground level) when the measured current Ib2 is output (is made to flow) is calculated based on the measurement signal (the voltage signal) of a voltage value (hereinafter referred to as a "voltage value Vb2") output from the sensor 1 to the electrode 1B. Thereafter, the processing unit 6 calculates a ratio of the current value of the reference current Ib1 and the current value of the measured current Ib2 (hereinafter referred to as a "current value ratio Ib", where Ib=Ib1/Ib2) and a ratio of the voltage value Vb1 and the voltage value Vb2 (hereinafter referred to as a "voltage value ratio Vb", where Vb=Vb1/Vb2), and determines (decides) whether the electrode 1B is normal depending on whether the difference between the current value ratio Ib and the voltage value ratio Vb is in a predetermined ratio deviation threshold range.

In this way, in the electromagnetic flow meter 110, it is possible to verify the electrode 1A and the electrode 1B. In the electromagnetic flow meter 110, the linearity of the measurement signals (the voltage signals) acquired from the sensor 1 may be easily determined based on the measurement signals (the voltage signals) or the resistance values which are measured or calculated when the electrode 1A and the electrode 1B are verified. In the electromagnetic flow meter 110, since the verification of the electrode 1A and the verification of the electrode 1B can be separately performed, it is possible to verify the abnormality of each of the electrode 1A and the electrode 1B or the linearity of the measurement signal and to determine the soundness of the electromagnetic flow meter 110. In the electromagnetic flow meter 110, it is possible to verify the abnormality of the electrode or the linearity of the measurement signal without depending on the type of the liquid flowing in the pipe, that is, without depending on conductance of the liquid, and to determine the soundness of the electromagnetic flow meter 110.

In the aforementioned description, the verification of the electrode 1A and the verification of the electrode 1B are separately performed. However, when the verifications of the electrodes do not have to be separately performed, that is, when it is not necessary to determine the soundness for each electrode, the abnormality of the electrodes or the linearity of the measurement signals may be verified based on the digital measurement signals output from the flow rate signal A/D conversion circuit 41. That is, it may be possible to perform the verification of the electrode 1A and the verification of the electrode 1B together.

Modified Examples

An example of the verification method when the electrode 1A and the electrode 1B in the electromagnetic flow meter 110 are verified together will be described below. The verification of the electrode 1A and the electrode 1B in a lump is one verification item included in the operation verification (Operation Verification 2) of the sensor 1 which is performed in the electromagnetic flow meter 110. In the following description, it is also assumed that the excitation circuit 51 outputs an excitation current based on a time signal output from the divider circuit 611 to the excitation coil in response to a control signal input from the operation verifying unit 61 (not illustrated). In the following description, it is also assumed for the purpose of convenience of explanation that the processing unit 6 executes the operation verifying program and verifies the operation of the sensor 1.

In the verification of the electrode 1A and the electrode 1B in a lump, a reference current and a measured current are made to flow in the electrode 1A, AC currents which are obtained by inverting the reference current and the measured current are made to flow in the electrode 1B, and resistance values of a liquid flowing between the electrodes and the pipe (the ground level) are calculated based on the measurement signals acquired from the sensor 1. Similar to the case in which the electrode 1A and the electrode 1B are separately verified, the ratio of the AC currents and the ratio of the measurement signals or the ratio of the resistance values are compared and it is determined (decided) whether the electrodes are normal based on the difference between the ratios, that is, the ratio deviation.

More specifically, the AC constant-current circuit 20A outputs the reference current Ia1 to between the corresponding electrode 1A and the pipe (the reference current is made to flow therebetween). The AC constant-current circuit 20B outputs a reference current which is obtained by inverting the reference current Ia1 (hereinafter, the reference current obtained by inverting the reference current Ia1 is referred to as a "reference current Ib1") to between the corresponding electrode 1B and the pipe (the reference current is made to flow therebetween). Accordingly, a measurement signal with the magnitude of the electromotive force (the voltage value Va1) corresponding to the reference current Ia1 generated by the liquid flowing in the pipe is output from the sensor 1 to the electrode 1A. A measurement signal with the magnitude of the electromotive force (the voltage value Vb1) corresponding to the reference current Ib1 generated by the liquid flowing in the pipe is output from the sensor 1 to the electrode 1B. The buffer circuit 2A outputs the measurement signal, which is output from the sensor 1 to the electrode 1A, to the differential amplifier circuit 31 and the buffer circuit 2B outputs the measurement signal, which is output from the sensor 1 to the electrode 1B, to the differential amplifier circuit 31. The differential amplifier circuit 31 outputs the analog measurement signal, which is obtained by taking and amplifying a difference between the measurement signals output from the buffer circuit 2A and the buffer circuit 2B, to the flow rate signal A/D conversion circuit 41 and the flow rate signal A/D conversion circuit 41 outputs the digital measurement signals corresponding to the magnitudes of the analog measurement signals output from the differential amplifier circuit 31 to the processing unit 6. Accordingly, the processing unit 6 calculates a reference resistance value (hereinafter referred to as a "reference resistance value R1") of the liquid flowing between the electrodes 1A and 1B and the pipe (the ground level) when the reference current Ia1 and the reference current Ib1 (hereinafter referred to as a "reference current I1" together) are output (are made to flow) based on the signal levels of the digital measurement signals (that is, voltage value Va1-voltage value Vb1 which is hereinafter referred to as a "voltage value V1") output from the flow rate signal A/D conversion circuit 41. When the reference resistance value R1 is calculated, it is generally preferable that the reference resistance value be calculated after linearity correction which is performed on the sensor 1, the buffer circuit 2A, the buffer circuit 2B, the differential amplifier circuit 31, and the flow rate signal A/D conversion circuit 41 is applied beforehand.

Subsequently, the AC constant-current circuit 20A outputs the measured current Ia2 to between the corresponding electrode 1A and the pipe (the measured current is made to flow therebetween). The AC constant-current circuit 20B outputs a measured current which is obtained by inverting the measured current Ia2 (hereinafter, the measured current obtained by inverting the measured current Ia2 is referred to as a "measured current Ib2") to between the corresponding electrode 1B and the pipe (the measured current is made to flow therebetween). Accordingly, similar to when the reference current Ia1 is output (is made to flow), a measurement signal with the magnitude of the electromotive force (the voltage value Va2) corresponding to the measured current Ia2 generated by the liquid flowing in the pipe is output from the sensor 1 to the electrode 1A. Similar to whether the reference current Ib1 is output (is made to flow), a measurement signal with the magnitude of the electromotive force (the voltage value Vb2) corresponding to the measured current Ib2 generated by the liquid flowing in the pipe is output from the sensor 1 to the electrode 1B. The buffer circuit 2A, the buffer circuit 2B, the differential amplifier circuit 31, and the flow rate signal A/D conversion circuit 41 operate in the same way as when the reference current I1 is output (is made to flow) and outputs the digital measurement signals corresponding to the magnitudes of the analog measurement signals to the processing unit 6. Accordingly, the processing unit 6 calculates a reference resistance value (hereinafter referred to as a "reference resistance value R2") of the liquid flowing between the electrodes 1A and 1B and the pipe (the ground level) when the measured current Ia2 and the measured current Ib2 (hereinafter referred to as a "measured current I2" together) are output (are made to flow) based on the signal levels of the digital measurement signals (that is, voltage value Va2-voltage value Vb2 which is hereinafter referred to as a "voltage value V2") output from the flow rate signal A/D conversion circuit 41. When the reference resistance value R2 is calculated, it is generally preferable that the reference resistance value be calculated after linearity correction which is performed on the sensor 1, the buffer circuit 2A, the buffer circuit 2B, the differential amplifier circuit 31, and the flow rate signal A/D conversion circuit 41 is applied beforehand, similar to when the reference resistance value R1 is calculated.

Thereafter, similar to when the electrode 1A and the electrode 1B are separately verified, the processing unit 6 calculates a ratio of the current value of the reference current I1 and the current value of the measured current I2 using Equation (3), and calculates a ratio of the voltage value V1 and the voltage value V2 using Equation (4).

$$I = I1/I2 \tag{3}$$

$$V = V1/V2 \tag{4}$$

In Equation (3), I denotes a ratio of the current values of the AC constant-current signals (the current value ratio) output from the AC constant-current circuit 20A and the AC constant-current circuit 20B. In Equation (4), V denotes a ratio of the magnitudes of the electromotive forces (voltage values) (the voltage value ratio) generated to correspond to the AC constant-current signals. The processing unit 6 determines whether a difference between the current value ratio I and the voltage value ratio V is in a predetermined ratio deviation threshold range, and determines (decides) whether the electrode 1A and the electrode 1B are normal based on the determination result. For example, it is determined that the electrode 1A and the electrode 1B are normal when the difference between the current value ratio I and the voltage value ratio V is less than 2%, it is determined that the electrode 1A and the electrode 1B are abnormal when the difference is greater than 2%.

In determining whether the electrode 1A and the electrode 1B are normal, the difference between the current value ratio I calculated using Equation (3) and the voltage value ratio V calculated using Equation (4) is compared with the predetermined ratio deviation threshold range. However, the method of determining whether the electrode 1A and the electrode 1B are normal is not limited to the above-mentioned method, similar to when the electrode 1A and the electrode 1B are separately verified. For example, the reference resistance value R1 and the measured resistance value R2 may be compared and it may be determined whether the electrode 1A and the electrode 1B are normal depending on whether the difference between the reference resistance value R1 and the measured resistance value R2 is in a predetermined resistance value deviation threshold range. Here, similar to when the electrode 1A and the electrode 1B are separately verified, the reference resistance value R1 and the measured resistance value R2 are resistance values which are calculated based on the measurement signals acquired when the same liquid flows between the electrodes 1A and 1B and the pipe (the ground level) with the current value of the AC current changed to the reference current I1 or the measured current I2. Accordingly, when the electrode 1A and the electrode 1B are normal, the reference resistance value R1 and the measured resistance value R2 are predicted to have the same value, similar to when the electrode 1A and the electrode 1B are separately verified. Accordingly, when the difference between the reference resistance value R1 and the measured resistance value R2 is large, it is possible to determine that the electrode 1A and the electrode 1B are abnormal.

In verification of the electrode 1A and the electrode 1B in a lump, similar to when the electrode 1A and the electrode 1B are separately verified, the linearity of the measurement signals (the voltage signals) acquired from the sensor 1 may be determined by outputting the current value of the measured current I2 to between the electrodes 1A and 1B and the pipe (causing the measured current to flow therebetween) while sequentially changing the current value and sequentially calculating the measured resistance value R2 corresponding to the measured current I2 based on the measurement signal (the voltage signal) output from the sensor 1. Accordingly, a correction coefficient of linearity correction which is performed on the sensor 1, the buffer circuit 2A, the buffer circuit 2B, the differential amplifier circuit 31, and the flow rate signal A/D conversion circuit 41 in the electromagnetic flow meter 110 may be updated even when the electrode 1A and the electrode 1B are verified together. When linearity of the measurement signal (the voltage signal) acquired from the sensor 1 is determined, it is preferable that a sufficient time be secured as an interval at which the current value of the measured current I2 output from (flowing by) the AC constant-current circuit 20A and the AC constant-current circuit 20B, similar to when the electrode 1A and the electrode 1B are separately verified is changed. Accordingly, even when the electrode 1A and the electrode 1B are verified in a lump, similar to when the electrode 1A and the electrode 1B are separately verified, it is possible to suppress a measurement variation of the voltage value V2 between the measured currents I2 to more accurately calculate the measured resistance value R2 of the electrode 1A and the electrode 1B by obtaining the measurement signal (the voltage value V2) which is acquired in a state in which the sensor 1 is stabilized.

In this way, in the electromagnetic flow meter 110, the electrode 1A and the electrode 1B can be verified in a lump. In the electromagnetic flow meter 110, when the electrode 1A and the electrode 1B are verified in a lump, it may be possible to determine the linearity of the measurement signals (the voltage signals) measured by the sensor 1. When the electrode 1A and the electrode 1B are verified in a lump, the electrode resistance signal A/D conversion circuit 42A and the electrode resistance signal A/D conversion circuit 42B in the electromagnetic flow meter 110 illustrated in FIG. 4 may not be provided and it is thus possible to reduce the circuit scale of the electromagnetic flow meter 110.

As described above, according to the embodiment of the present invention, the operation verifying unit that verifies the soundness of the field device in accordance with the operation verifying program is disposed in the processing unit of the field device disposed in a facility installed in a plant. Accordingly, in the embodiment of the present invention, the field device can verify its own soundness alone. Accordingly, in the embodiment of the present invention, it is possible to verify the soundness of the field device without using an external device such as a device checking terminal which has needed to be connected thereto for the purpose of verification of soundness of a field device in the related art.

In the embodiment of the present invention, many parameters or a large amount of data which is used to verify the soundness of the field device are internal parameters or data of the field device. Accordingly, in the embodiment of the present invention, it is possible to verify the soundness of the field device even without transmitting of the many parameters or large amount of data required to verify the soundness to a device checking terminal connected externally thereto by communication, unlike the field device according to the related art. That is, in the embodiment of the present invention, it is possible to remove much time required for transmitting the parameters or data in the field device according to the related art when the field device verifies its own soundness. Accordingly, in the embodiment of the present invention, it is possible to further shorten the time required from the start of the verification of soundness of the field device to the end of the verification of soundness than that in the field device according to the related art.

In the embodiment of the present invention, the simulated signal generating circuit that outputs simulated measurement signals of a voltage, a current, a time difference, a phase difference, a frequency, and the like which simulate the measurement signals output from the sensor disposed in the field device depending on the type of the field device is disposed in the field device. In the embodiment of the present invention, it is possible to verify the operations of the elements of the field device using the simulated measurement signals output from the simulated signal generating circuit. Accordingly, in the embodiment of the present invention, it is possible to verify the operations of the elements of the field device without using an external device such as a reference signal generating device which has needed to be connected thereto for the purpose of verification of soundness of a field device in the related art. That is, in the embodiment of the present invention, it is possible to verify the operations of the elements from an input to an output (from the sensor to the output circuit) in the field device. Accordingly, in the embodiment of the present invention, it is possible to enhance the coverage when verifying the operations of the elements of the field device in verifying the soundness of the field device.

In the embodiment of the present invention, the verification result of the soundness of the field device and the verification results of the elements of the field device are stored in the memory disposed in the field device. In the embodiment of the present invention, the verification results stored in the memory are presented to an operator instructing the verification (an operator who has performed the checking operation of the field device) by displaying the verification results on the operation and display unit of the field device. In the embodiment of the present invention, even an operator other than the operator having performed the checking operation of the field device can refer to the verification results stored in the memory of the field device at an arbitrary time. In the embodiment of the present invention, the verification results stored in the memory of the field device have a smaller amount of data than that of the parameters or data required for verifying the soundness. Accordingly, in the embodiment of the present invention, even when the verification results stored in the memory of the field device are acquired and referred to by communication using a communication network which is exclusively constructed in the plant or communication with a device checking terminal connected to the field device, an operator referring to the verification results can acquire the verification results in a short communication time. Accordingly, in the embodiment of the present invention, it is possible to efficiently perform a checking operation of a field device in a plant.

As used herein, the following directional terms "forward, rearward, above, downward, right, left, vertical, horizontal, below, transverse, row and column" as well as any other similar directional terms refer to those directions of a device equipped with the present invention. Accordingly, these terms, as utilized to describe the present invention should be interpreted relative to a device equipped with the present invention.

The terms of degree such as "substantially," "about," and "approximately" as used herein mean a reasonable amount of deviation of the modified term such that the end result is not significantly changed. For example, these terms can be construed as including a deviation of at least ±5 percent of the modified term if this deviation would not negate the meaning of the word it modifies.

The term "configured" is used to describe a component, unit or part of a device includes hardware and/or software that is constructed and/or programmed to perform the desired function.

Moreover, terms that are expressed as "means-plus function" in the claims should include any structure that can be utilized to perform the function of that part of the present invention.

The term "unit" or "part" is used to describe a component, unit or part of a hardware and/or software that is constructed and/or programmed to perform the desired function. Typical examples of the hardware may include, but are not limited to, a device and a circuit.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A field device that measures a physical quantity in a plant or processes the physical quantity, comprising:
   an instruction unit configured to output a verification execution instruction signal for instructing execution of verification of the field device;
   an operation verifying unit configured to verify an operation of at least one element of the field device in response to the verification execution instruction signal and to verify an operation of the field device based on the verification result;
   an output unit configured to output the verification result which is a result of verification of the operation by the operation verifying unit;
   a measuring unit configured to measure the physical quantity and to output a measurement signal indicating the measurement result;
   an analog-based circuit comprising:
      a buffer circuit configured to convert impedance of the measurement signal output from the measuring unit;
      an amplification and band limiting circuit configured to convert a signal level or a range of the measurement signal whose impedance has been converted by the buffer circuit to output an analog measurement signal; and
      an analog-digital conversion circuit configured to convert the analog measurement signal output from the amplification and band limiting circuit into a digital signal, and configured to output the digital signal;
   a simulated signal generating circuit configured to output a simulated measurement signal which simulates the measurement signal; and
   a signal switch configured to connect one of the measuring unit and the simulated signal generating circuit to the analog-based circuit,
   wherein the operation verifying unit is configured to:
      output the simulated measurement signal from the simulated signal generating circuit;
      input the simulated measurement signal into the element included in the analog-based circuit via the signal switch;
      compare a first digital value with a second digital value, the first digital value being indicated by the digital signal output from the element into which the simulated measurement signal has been input, the second digital value being assumed by the simulated measurement signal;
      determine whether the first digital value is in a threshold range determined in advance for the second digital value;
      determine that the element is normal in a case where the first digital value is in the threshold range; and
      determine that the element is abnormal in a case where the first digital value is not in the threshold range, and
   wherein the simulated signal generating circuit is configured to adjust a signal level of the simulated measurement signal to a level covering a range in which the element operates under a control of the operation verifying unit.

2. The field device according to claim 1, further comprising a storage unit configured to store the verification result corresponding to the at least one element of which the operation is verified by the operation verifying unit and the verification result corresponding to the field device.

3. The field device according to claim 2, wherein the storage unit stores at least one of the verification result of verification which is executed in an initial stage of the field device and the verification result of verification which is executed in an installation stage in which the field device is installed in the plant and the verification result of verification which is executed in an operating stage in which the field device is operated.

4. The field device according to claim 3, wherein the storage unit stores information of a date and time at which verification is executed in the operating stage of the field device in correlation with the verification result of the verification to correspond to a predetermined number of times.

5. The field device according to claim 1, wherein the simulated measurement signal is a signal which simulates at least one of voltage, current, time difference, phase difference, and frequency which are output as the measurement signal from the measuring unit.

6. The field device according to claim 1, wherein the output unit includes a display unit configured to present the verification result, and
   the instruction unit includes an operation unit configured to output the verification execution instruction signal in response to an operation by an operator.

7. The field device according to claim 1, further comprising a signal switch configured to:
   input the measurement signal output from the measuring unit into the element in a case where the field device measures the physical quantity in the plant; and input the simulated measurement signal into the element in a case where the field device verifies the operation.

8. The field device according to claim 1, wherein the output unit transmits the verification result via a communication network which is constructed in the plant.

9. A method of measuring a physical quantity in a plant or processing the physical quantity by a filed device, comprising:
- an instruction step of outputting a verification execution instruction signal for instructing execution of verification of the field device;
- an operation verifying step of verifying an operation of at least one element of the field device in response to the verification execution instruction signal and to verify an operation of the field device based on the verification result;
- an output step of outputting the verification result which is a result of verification of the operation by the operation verifying step;
- a measuring step of measuring the physical quantity and outputting a measurement signal indicating the measurement result;
- a first converting step of converting, by a buffer circuit, impedance of the measurement signal which has been output;
- a second converting step of converting, by an amplification and band limiting circuit, a signal level or a range of the measurement signal whose impedance has been converted by the buffer circuit to output an analog measurement signal;
- a third converting step of converting, by an analog-digital conversion circuit, the analog measurement signal output from the amplification and band limiting circuit into a digital signal, and outputting the digital signal;
- a simulated signal generating step of outputting, by a simulated signal generating circuit, a simulated measurement signal which simulates the measurement signal; and
- a connecting step of connecting, by a signal switch, one of the measuring unit and the simulated signal generating circuit to the analog-based circuit, wherein the operation verifying step includes:
- a step of outputting the simulated measurement signal from the simulated signal generating circuit;
- a step of inputting the simulated measurement signal into the element included in the analog-based circuit via the signal switch;
- a step of comparing a first digital value with a second digital value, the first digital value being indicated by the digital signal output from the element into which the simulated measurement signal has been input, the second digital value being assumed by the simulated measurement signal;
- a step of determining whether the first digital value is in a threshold range determined in advance for the second digital value;
- a step of determining that the element is normal in a case where the first digital value is in the threshold range; and
- a step of determining that the element is abnormal in a case where the first digital value is not in the threshold range, and wherein the method further comprises:
- a step of adjusting, by the simulated signal generating circuit, a signal level of the simulated measurement signal to a level covering a range in which the element operates under a control of the operation verifying step.

10. The method according to claim 9, further comprising a storage step of storing the verification result corresponding to the at least one element of which the operation is verified by the operation verifying step and the verification result corresponding to the field device.

11. The method according to claim 10, wherein the storage step includes a step of storing at least one of the verification result of verification which is executed in an initial stage of the field device and the verification result of verification which is executed in an installation stage in which the field device is installed in the plant and the verification result of verification which is executed in an operating stage in which the field device is operated.

12. The method according to claim 11, wherein the storage step further includes a step of storing information of a date and time at which verification is executed in the operating stage of the field device in correlation with the verification result of the verification to correspond to a predetermined number of times.

13. The method according to claim 9, wherein the simulated measurement signal is a signal which simulates at least one of voltage, current, time difference, phase difference, and frequency which are output as the measurement signal from the measuring step.

14. The method according to claim 9, wherein the output step includes a step of transmitting the verification result via a communication network which is constructed in the plant.

* * * * *